US 9,992,838 B1

United States Patent
Coombes et al.

(10) Patent No.: US 9,992,838 B1
(45) Date of Patent: Jun. 5, 2018

(54) AUTOMATED LUMINAIRE IDENTIFICATION AND GROUP ASSIGNMENT DEVICES, SYSTEMS, AND METHODS USING DIMMING FUNCTION

(71) Applicant: Gooee Limited, St Albans (GB)

(72) Inventors: Simon Coombes, St Petersburg, FL (US); Dan Andrei Tutunea, Surrey (GB); Shmuel Silverman, Novato, CA (US); Mark Wilson, London (GB); Jonathan Couch, Wilshire (GB)

(73) Assignee: Gooee Limited, St Albans (GB)

( * ) Notice: Subject to any disclaimer, the term of this patent is extended or adjusted under 35 U.S.C. 154(b) by 0 days. days.

(21) Appl. No.: 15/807,071

(22) Filed: Nov. 8, 2017

Related U.S. Application Data

(63) Continuation-in-part of application No. 15/643,244, filed on Jul. 6, 2017.

(60) Provisional application No. 62/492,849, filed on May 1, 2017, provisional application No. 62/521,978, filed on Jun. 19, 2017.

(51) Int. Cl.
*H05B 33/08* (2006.01)
*H05B 37/02* (2006.01)

(52) U.S. Cl.
CPC ..... *H05B 33/0854* (2013.01); *H05B 33/0851* (2013.01); *H05B 33/0869* (2013.01); *H05B 37/0218* (2013.01); *H05B 37/0272* (2013.01)

(58) Field of Classification Search
None
See application file for complete search history.

(56) References Cited

U.S. PATENT DOCUMENTS

| 2006/0049935 | A1 | 3/2006 | Giannopoulos et al. |
| 2008/0218334 | A1 | 9/2008 | Pitchers et al. |
| 2008/0309259 | A1 | 12/2008 | Snijder et al. |
| 2011/0122796 | A1 | 5/2011 | Simons et al. |
| 2012/0072138 | A1 | 3/2012 | Walters et al. |
| 2013/0088168 | A1* | 4/2013 | Mohan .................. G05B 15/02 315/297 |
| 2013/0221858 | A1 | 8/2013 | Silberstein |
| 2014/0086590 | A1 | 3/2014 | Ganick et al. |
| 2014/0336821 | A1 | 11/2014 | Blaine et al. |
| 2015/0130365 | A1 | 5/2015 | Kim et al. |

(Continued)

FOREIGN PATENT DOCUMENTS

WO  WO-2012131631 A1  10/2012

OTHER PUBLICATIONS

U.S. Department of Energy, LED Measurement Series: LED Luminaire Reliability, Oct. 2009, 4 pages, www.ssl.energy.gov.

(Continued)

*Primary Examiner* — Dedei K Hammond
(74) *Attorney, Agent, or Firm* — Moyles IP, LLC

(57) ABSTRACT

The disclosed devices, systems, and methods may be used to automatically identify, locate, and assign luminaires into groups such that lighting systems may be more efficiently configured, used, and maintained especially in large buildings, etc. For example, a Lucas-Kanade function may be used with a system of sensors which are capable of detecting light patterns from individual and groups of luminaires to form virtual maps of luminaire locations which may be correlated with actual luminaire floor plans to efficiently identify, locate, and group the luminaires.

20 Claims, 20 Drawing Sheets

(56) References Cited

U.S. PATENT DOCUMENTS

2015/0382436 A1* 12/2015 Kelly .................... G08C 17/02
                                                    315/131
2016/0366752 A1    12/2016 Di Censo et al.
2017/0245352 A1     8/2017 Van Der Brug

OTHER PUBLICATIONS

Philips, Understanding power LED Lifetime analysis, Technology White Paper, Dec. 5, 2016, 11 pages, www.lrc.rpi.edu/programs/solidstate/assist/index.asp.

* cited by examiner

Signal Strength

| dBm | A | B | C | D | E |
|---|---|---|---|---|---|
| A | 0 | -59 | -73 | -59 | -72 |
| B | -60 | 0 | -41 | -53 | -41 |
| C | -74 | -42 | 0 | -69 | -60 |
| D | -58 | -53 | -70 | 0 | -41 |
| E | -72 | -42 | -59 | -41 | 0 |

Groups

| | A | B | C | D | E |
|---|---|---|---|---|---|
| Group | 1 | 2 | 2 | 2 | 2 |

Ambient light
| % | A | B | C | D | E |
|---|---|---|---|---|---|
| A | 100 | 0 | 0 | 14 | 9 |
| B | 1 | 100 | 82 | 65 | 79 |
| C | 0 | 81 | 0 | 57 | 70 |
| D | 15 | 67 | 58 | 100 | 83 |
| E | 8 | 80 | 69 | 84 | 100 |
FIG. 14
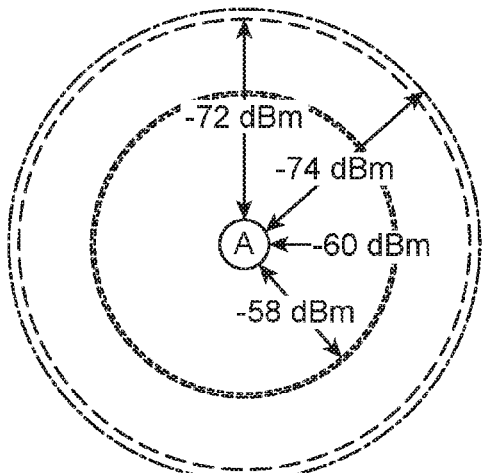
FIG. 15
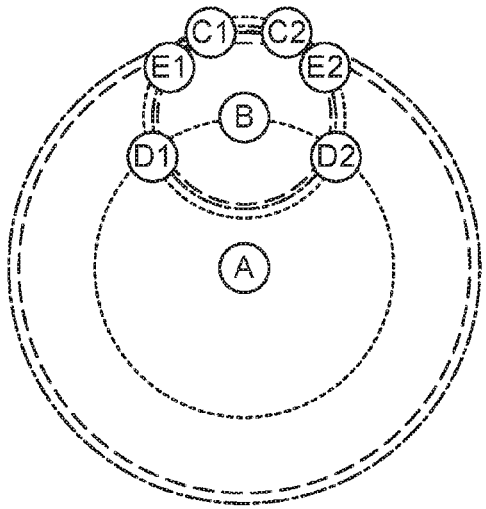
FIG. 16

AUTOMATED LUMINAIRE IDENTIFICATION AND GROUP ASSIGNMENT DEVICES, SYSTEMS, AND METHODS USING DIMMING FUNCTION

CROSS-REFERENCE TO RELATED APPLICATIONS

This application is a continuation-in-part of and claims priority to U.S. patent application Ser. No. 15/643,244 filed Jul. 6, 2017, which claims the benefit of U.S. Provisional Patent Application Ser. No. 62/492,849 filed May 1, 2017. This application claims the benefit of U.S. Provisional Patent Application Ser. No. 62/521,978 filed Jun. 19, 2017. The disclosures of all of the applications listed above are incorporated herein by reference in their entireties.

FIELD OF THE DISCLOSURE

The current disclosure relates generally to devices, systems, and methods that automate luminaire location identification and group assignment. In particular, devices, systems, and methods for automatic luminaire identification and group assignment using a dimming function for commissioning a lighting control system are disclosed.

BACKGROUND OF THE DISCLOSURE

In lighting control systems with distributed networked/intelligent devices such as smart gateways and associated luminaires with light sources such as light emitting diodes (LED), it is imperative that each unique network address and physical location of a device is correctly identified and associated with the location/area of control of the device to facilitate correct operational configuration of the system.

Current Identification methods include:

Detachable Printed ID Number—An identification number and/or scan-code sticker is removed from the lighting device upon installation and affixed to an installation drawing depicting the device's relevant location. The installation drawing is then used to identify luminaires when commissioning/configuring the lighting system.

Barcode (or other scan-code medium)—A barcode is removed from the lighting device and affixed to an installation drawing depicting the device's relevant location for later scanning or scanning in-situ. The barcode and drawing are used to directly generate and/or update information within a lighting system commissioning application (such as software on a computer or handheld tool).

Service Pin—For some installed devices, if the location and/or other identification information of the installed device has not been previously recorded, it is then possible to identify the device by pressing a 'service pin' (physical button on the device) while a commissioning application or tool is in a listening mode to detect a signal generated by the device in response to pressing the service pin. The network address and/or physical location of the device may then be displayed or assigned to a pre-configured 'dummy'/virtual device.

Wink Function—To facilitate observational identification of luminaires particularly with networked Digital Addressable Lighting Interface (DALI)® addressed devices, which generally do not support the previous methods, the network is scanned for previously un-provisioned (i.e., unidentified and/or unintegrated into the lighting system control) devices using a commissioning application or tool and the detected devices are listed on a user device. A 'wink' option button is provided for each of the results and causes the related luminaire to flash on and off repeatedly when selected by a user. When witnessed by the user, the device address and physical location can then be correctly assigned.

Once the network addresses of all networked lighting devices are known along with location information, the next process conducted will be to assign them to operational groups ("group assignment"), representing areas such as rooms and corridors. This is ordinarily achieved by manually assigning known addressed devices to a group object so that all members can be controlled by a single command/message when later configured/programmed.

As the size of a single lighting control network grows beyond that of a single zone of a floor, to the whole floor, the whole building and areas beyond; the time and labor expended on luminaire/networked device identification will likely be quite extensive. Most presently employed methods of device identification require some form of direct manual interaction and/or direct observation of the individual luminaire being identified.

With the emergence of Internet of Things (IoT) based lighting control systems, the size of a single installation when compared to existing localized networked solutions will grow in size significantly due to the absence of limitations imposed by more localized technologies. As such, in order to reduce the installation and commissioning time for a large project based on the issues outlined, the requirement for an automated method of luminaire/device discovery/identification and group assignment becomes apparent.

If, during the physical installation of an intelligent lighting control system, all information regarding addresses and locations has been accurately mapped and added directly to a commissioning application/tool or drawing, the issue of post-installation identification may not generally present a major problem. However, from experience this is not always accurately carried out by electricians/installers and physical media such as installation drawings (with IDs attached) can be lost/damaged. Further, pre-configured maps and/or specifications cannot account for so-called dynamic lighting system aspects, such as adding or removing a luminaire or replacing a luminaire with a luminaire of a different type.

Given the state of the art, there is a need for a system and method for automatic, dynamic luminaire location identification and group assignment capability using automated wink and/or dimming functions and related identification functions for commissioning a lighting control in very large ecosystems such as a whole building or a floor, in quick turn-around time and reducing manual efforts. Additionally, in very large systems with automatic group assignment capability (even when all individual device addresses are already known), an automated process could still present a significant commissioning timesaving.

BRIEF DESCRIPTION OF THE EXEMPLARY EMBODIMENTS

This disclosure relates to devices, systems, and methods for automated luminaire location identification. For example, this disclosure relates to a system for automatic luminaire location identification and group assignment for commissioning a lighting control. Further, this disclosure relates to automated commissioning process resulting in correct positioning of each luminaire device to the correct floor plan location and assigning each luminaire device to the correct location within a focused area. According to one aspect, the system includes at least one of a plurality of luminaires and a plurality of LED's, at least one sensor subsystem, at least one gateway, at least one wireless device for exchanging data, at least one network device, at least one cloud server, and at least one network gateway. The system may further include at least one dimming control protocol installed in a plurality of lighting devices and for controlling a plurality of dimming levels of the plurality of lighting devices. In an embodiment, the gateway may be capable of discovering the at least one dimming control protocol installed in the plurality of lighting devices and controlling the dimming levels of the plurality of lighting devices. Further, the gateway may be capable of controlling the power to the luminaire and is capable of dimming the luminaire to 0 brightness or shutting it off completely. The at least one of the plurality of luminaires and the plurality of LED's is physically or wirelessly connected to the gateway via at least one dimming control interface. For purposes of this disclosure, a "dimmed" luminaire is generally a luminaire that has a brightness (e.g., luminous intensity) of any value below its possible maximum, including 0, and "dimming" a luminaire generally means reducing the brightness of the luminaire to any value below its possible maximum, including 0, or switching the luminaire OFF. In addition, for purposes of this disclosure, "reducing the dimming level" of a luminaire generally means increasing the brightness of the luminaire to any value above 0. For example, a dimming level of 100% may be considered the minimum possible brightness of the luminaire (or the OFF state), and a dimming level of 0% may be considered the maximum possible brightness of the luminaire (or the ON state). In such case, reducing the dimming level of the luminaire from 100% to 0% would increase the brightness of the luminaire from its minimum to its maximum.

The at least one sensor subsystem may include at least two sets of one or more sensors. A first set of sensors or a single sensor may include an environment sensor dedicated to environment sensing, and may be arranged such that it faces away and/or extends in a downward fashion from the luminaire. A second set of sensors or a single sensor may include a color sensor such as a Red Green Blue (RGB) sensor arranged such that it faces the luminaire directly. The environment sensor senses and captures environmental data in real time. For purposes of this disclosure, "real time" means substantially concurrent. The phrase "real time" does not imply any particular timeframe and does not limit the disclosure of the exemplary embodiments.

According to an aspect, the at least one sensor subsystem is connected with the gateway along with the luminaire and the LED's. In an embodiment, the at least one cloud server is connected via at least one of a wired connection and a wireless connection, with the at least one gateway. The disclosed systems are configured to locate, identify, and group luminaires based on dimming activity such as a wink or dimming function at each luminaire.

In another aspect, the disclosure is directed to a method of automatic luminaire location identification for commissioning a lighting control system. In an exemplary embodiment, the light detection algorithm is using the detection of light patterns emitted by the luminaires while reducing dimming levels (increasing brightness) of the luminaires, storing the light patterns in the at least one cloud server for comparison in a two dimensional array, comparing the detected light patterns with pre-defined light patterns and creating a virtual map or luminaire locations where all luminaire devices are located correctly relative to each other. After assignment of locations for all luminaires, the locations are adjusted using neighborhood group data and light intensity data for the luminaires. The luminaire device positions within the virtual map are then compared with the luminaire locations in the actual floor plan and each luminaire is assigned to its correct location in the actual floor plan.

In an embodiment, the light patterns emitted by the luminaires during winking or reduced dimming are detected by using a downward-looking environment sensor of the sensor subsystem. The exemplary process is to turn the dimming level of one or more luminaires down slowly, thus increasing the brightness, and monitor and communicate to a server the direction of the received light, e.g., using sensor subsystems of surrounding luminaires that can "see" the emitted light and have associated gateways in communication with the server.

Exemplary embodiments in accordance with the disclosure enable automatic luminaire identification and group assignment capability for commissioning a lighting control. These and other advantages will be apparent from the disclosure of the exemplary embodiments.

BRIEF DESCRIPTION OF THE DRAWINGS

The above and still further features and advantages of the disclosed embodiments will become apparent upon consideration of the following detailed description of embodiments thereof, especially when taken in conjunction with the accompanying drawings, and wherein:

FIG. 14 is a diagram illustrating process of acquiring the difference between baseline and test ambient light levels according to an illustration;

FIG. 15 is a diagram illustrating possible locations of devices B-E according to an illustration;

FIG. 16 is a diagram illustrating locations of devices D and E according to an illustration;

Figure 1:
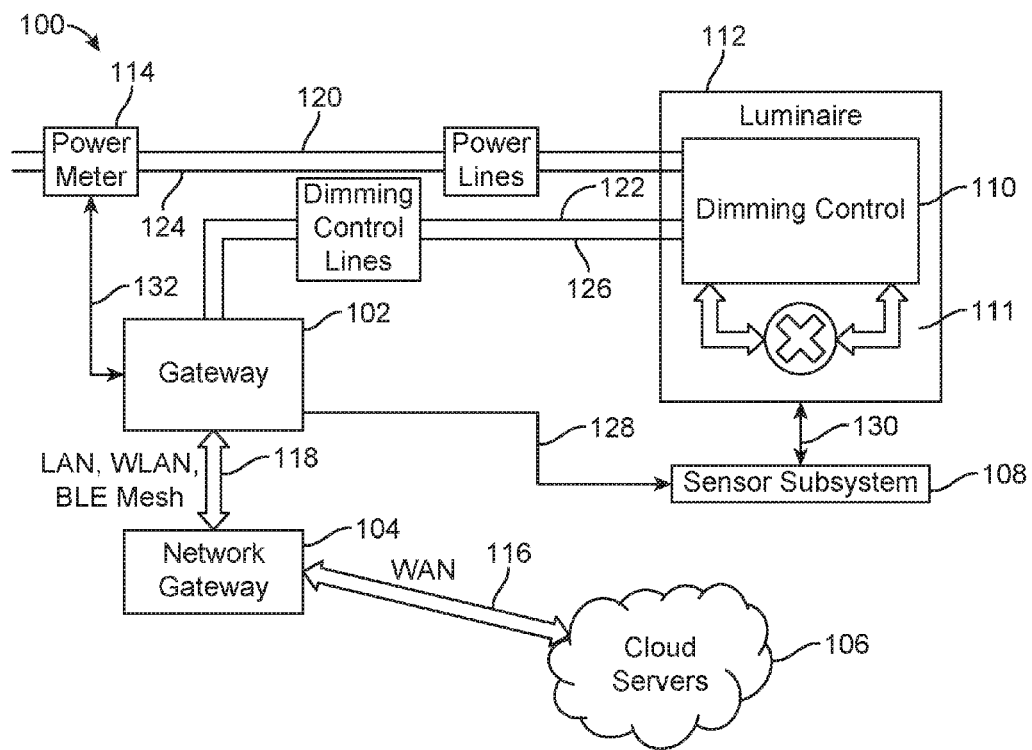
FIG. 1 is a high-level diagram of a system, according to an embodiment.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

The headings used herein are for organizational purposes only and are not meant to limit the scope of the description or the claims. To facilitate understanding, reference numerals have been used where possible, to designate like elements common to the figures.

DETAILED DESCRIPTION OF THE EXEMPLARY EMBODIMENTS

Exemplary embodiments of the disclosure relate generally to devices, systems, and methods for automated luminaire identification and group assignment. The exemplary embodiments facilitate automatic luminaire identification and group assignment capability for commissioning a lighting control. Additionally, the exemplary embodiments provide dimming control and facilitate ease of dynamic system integration associated with the vast size of required system, as well as ease of use and installation of such systems.

Exemplary embodiments of the disclosure will be illustrated below in conjunction with the various figures.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated those individual aspects of the disclosure can be separately claimed.

The term "computer-readable medium" as used herein refers to any tangible storage and/or transmission medium that participates in storing and/or providing instructions to a processor for execution. Such a medium may take many forms, including but not limited to nonvolatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to email or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Further, while reference is made to various types of databases, all of the database functions may be stored within compartments of a single database or multiple databases. In any event, the disclosure is considered to include a tangible storage medium or distribution medium and known equivalents and successor media, in which the software implementations of the disclosure are stored.

According to an aspect and with reference to FIG. 1, a system 100 for automatic luminaire location identification and group assignment capability for commissioning a lighting control is described. One or more components of the system 100 are installed in an environment such as a room, corridor, building, or any space that requires lighting. The system 100 includes at least one of a plurality of luminaires 112 and a plurality of LED's 111, a dimming control 110, at least one gateway 102 such as a Universal Smart Lighting Gateway (USLG), at least one network gateway 104, at least one sensor subsystem 108, at least one wireless device for exchanging data and at least one cloud server 106. In an embodiment, the luminaire 112 is a system that may include a single luminaire and LED or multiple luminaires and LEDs connected with a single common interface to power lines 120, 124 and dimming control lines 122, 126. The disclosure does not limit the number of luminaires 112, LEDs 111, or lighting devices within the exemplary lighting system embodiments. The luminaire 112 is connected to one or more sensors found in the at least one sensor subsystem 108. The sensors may be connected to the at least one gateway 102, which is further configured to control and communicate with the luminaire 112.

The sensor subsystem 108 may include at least one color sensor and downward looking environment sensor. The at least one color sensor faces the plurality of luminaires 112 and senses a color intensity of at least one of the plurality of luminaires 112 and the plurality of LED's 111. The at least one downward looking environment sensor senses a nearby environment of the plurality of luminaires 112 while facing away from the plurality of luminaires 112. The at least one downward looking environment sensor comprises at least one of an ambient light sensor, orientation sensor, movement detection sensor, and a temperature sensor.

According to an aspect of the exemplary embodiment, a power meter 114 is connected electrically between the gateway 102 and the luminaire 112 and connected electrically to the luminaire 112 via the power lines 120, 124. The power meter 114 is connected to the gateway 102 via the power meter interface 132. The power meter 114 is configured to measure and provide to the gateway 102 real time levels of power consumption by the luminaire 112.

As illustrated in FIG. 1, the sensor subsystem 108 connects via connection 130 to the luminaire 112 on one side and via a sensor interface 128 to the gateway 102 on the other side. In the exemplary embodiment the sensor subsystem 108 includes one or more environment sensors and one or more color sensors. Environment sensors sense and capture environmental data and human activities such as motion, direction, number of people passing through the environment ("footfall"), ambient light level and temperature, light from neighboring luminaires, etc. in real time. Color sensors measure at least one of color level and color intensity of luminaire 112. Information from sensor subsystem 108 is communicated to gateway 102. Gateway 102 also controls and communicates with the luminaire 112 and power meter 114 to monitor real time power consumption, voltage, dimming level, etc. of the luminaire 112. Information or data from the sensor subsystem 108 is transmitted to the cloud servers 106 for storage, processing, and the like via the gateway 102.

The gateway 102 is configured to gather and communicate data regarding the environment and luminaire 112/LED 111 from the sensor subsystem 108 to the cloud server 106. In an aspect, the gateway 102 may be capable of detecting, communicating and handling/controlling a plurality of dimming protocols via the dimming control device 110, and to control the dimming control device 110 to provide a plurality of dimming levels to the luminaire 112. In another aspect, a gateway and an environment sensor associated with at least one luminaire cooperate to detect and identify other luminaires visible by the environment sensor. For example, the environment sensor may be at least one low resolution image sensor with low frequency (10 frames per second). The polarity on the low resolution image sensor is reversed to identify light instead of dark areas. One gateway reduces the dimming level on its controlled luminaire slowly from 100% to 0%, thus increasing brightness, and all other gateways/environment sensors look for the light movement and direction as it comes from the lit luminaire. Data regarding the movement and direction of the luminaire is sent to cloud servers 106 to determine a relative location of the luminaire. Neighboring luminaires may then be grouped into neighborhood groups. Further, the exemplary system is configured for automatic additions and removal of luminaires 112 in such fashion.

In another aspect of the exemplary systems and methods for commissioning a lighting system, a virtual map of luminaire locations is created using luminaire identity, location, and group data collected by the gateways and environment sensors. The positions of the luminaire devices within the virtual map are compared with the positions of the luminaire devices in a real floor plan, and each luminaire device is assigned to the corresponding location thus creating location identification even if the luminaire group is not known. If you have a map of the room, there are physical locations where the luminaires are supposed to exist. We do not assign those luminaires to groups at that time. Information regarding luminaire identity, location, status, and control may then be communicated from the server to a user device with a user interface. The user obtains the information regarding the luminaires 112 and may provide control functions for the luminaires 112 to the gateway 102 from a remote location.

With continuing reference to the exemplary embodiment of FIG. 1, the connections 128, 130 from the sensor subsystem 108 to the gateway 102 and luminaire 112 may be physical and/or wireless and is not limited to a specific location. The location of the sensor subsystem 108 may be different depending on the types of sensors. For example and with reference to FIG. 3, physical sensor interfaces and connections may include the sensor interface 128 connected to the gateway 102. The gateway 102 is capable of communicating with and/or controlling the sensor subsystem 108 and sensor protocols via its sensor interface 128. Embodiments in accordance with the disclosure do not limit the type of hardware/wire/bus or wireless interfaces between the gateway 102 and the sensor subsystem 108, e.g., the number of wires, the type of wires or bus connectors, or wireless communication standards. The connections can be as simple as analog interface connectors and/or electrical/digital bus connectors of any kind.

According to an aspect and with reference to FIG. 1, the system 100 further includes a backhaul interface 118 connected to the gateway 102 and the network gateway 104. The backhaul interface 118 may be physically wired or a wireless Local Area Network (LAN/WLAN), including one or more of Mesh Bluetooth Low Energy (Mesh BLE), Smart Mesh, Bluetooth Mesh, WLAN, ZigBee, and/or Ethernet LAN. In an embodiment, the backhaul interface 118 is Mesh BLE. According to an aspect of the exemplary embodiment shown in FIG. 1, the gateway 102 is connected with the network gateway 104, which resides between the local networks to a Wide Area Network (WAN) 116. In an embodiment, the WAN 116 connects the gateway 102 to the cloud computers/servers 106 for operational and management interfaces. In such fashion, the server(s) 106 may exert control over luminaire 112 operation via the wireless device and/or the gateway 102.

Figure 2:
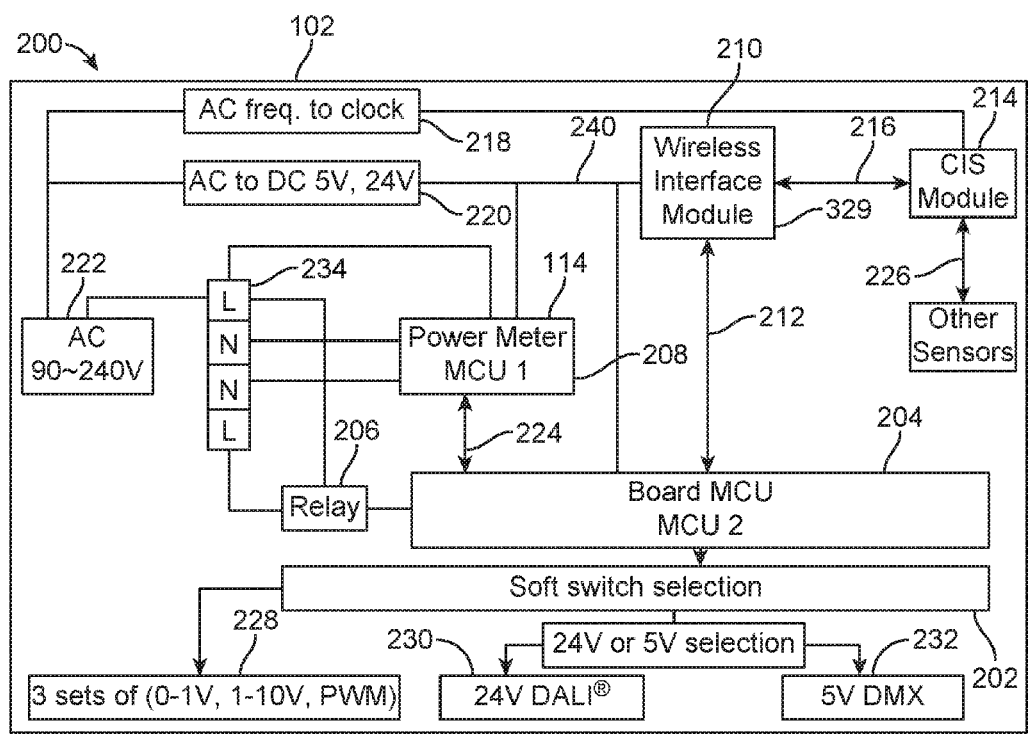
FIG. 2 is a diagram of a system, illustrating a power meter connection, according to an embodiment.

FIG. 2 depicts the gateway 102 in further detail. According to an aspect, a soft switch 202 to select between different electrical dimming interfaces is provided. The soft switch 202 may be actively used to search for the correct dimming protocol between the gateway 102 and the luminaire 112 where the luminaire 112 is a dimming luminaire 112. According to an aspect, protocol modules 228, 230, and 232 are the software implementation of the dimming interfaces that reside in the gateway 102. In an embodiment, the supported dimming protocol include several sets of protocols, such as, for example, 0V-10V, 1V-10V, pulse width modulation (PWM) 228, protocols over 0V-10V and/or 1V to 10V, a 24V DALI 230 protocol, and a 5V digital multiplex (DMX) 232 protocol. The protocols may each include algorithms, which may be implemented in a Micro Controller Unit 2 (MCU-2) 204. According to an aspect, the MCU-2 204 is powered by an AC to DC 5V, 24V power module 220 via a power line connection 240. MCU-2 204 may also be connected to a power meter 114 via a Micro Controller Unit 1 e.g., MCU-1 and a Universal Asynchronous Receiver/Transmitter (UART) 224. According to an aspect, MCU-2 204 is also connected to a Relay 206. MCU-2 204 may also be connected to a Wireless Interface Module (WIM) 210 via a Serial Peripheral Interface (SPI) bus 212. In an embodiment, the MCU-2 204 also controls the Relay 206, which may be designed to cut off/block the current to the luminaire 112 upon a decision by the MCU-2 204. The power cutoff can be used to disconnect power from the controlled luminaire subsystem (for example, FIG. 1). In an embodiment, the WIM 210 is implemented as Bluetooth Low Power (BLE) device that uses the Mesh BLE protocol to connect with other devices, as well as having the SPI bus 212 and an Inter-Integrated Circuit Two-Wire Serial Interface bus (TWSI) 216. The WIM 210 is connected to the Camera Interface System (CIS) module 214, which may be, for instance, an environment sensor and a Red, Green, Blue (RGB) sensor combination device. The CIS module 214 can be extended via a second TWSI bus 226 with other sensor modules. The CIS module 214 may require a clock, which is received via an AC Frequency to a clock module interface 218. The WIM 210 may require power, which is typically received via the AC to DC 5V, 24V power module 220 via the power interface line 240. According to an aspect, an AC Power 90V-240V power module 222 is relayed to the MCU-2 204 via a Line Control (LNNL) 234, and relayed from the MCU-2 204 to the soft switch 202 for power selection for the dimming protocol interfaces. The AC Power module 222 may also be relayed to the power meter 114 via the LNNL 234, which measures all power delivered to the luminaire 112. The LNNL 234 illustrated in FIG. 2, and according to an aspect, provides the physical electrical line connections.

The power meter 114 connections are described in further detail with reference to FIG. 2. The power meter 114 may be connected to an input line of the luminaire 112 (as shown in FIG. 1), in such a way that the power meter 114 measures electrical power drawn by the luminaire 112 in real time. According to an aspect, the power meter 114 is connected to the gateway 102 to provide real time power measurements correlated 1-1 to luminaire power drawn at any given moment. The interface 132 between the gateway 102 and the power meter 114 may be a Universal Asynchronous Receiver/Transmitter (UART) or other communication interface ("power meter interface"). The interface 120, 124 between the power meter device 114 and the luminaire 112 may depend on the type of power meter 114 being used.

Figure 3:
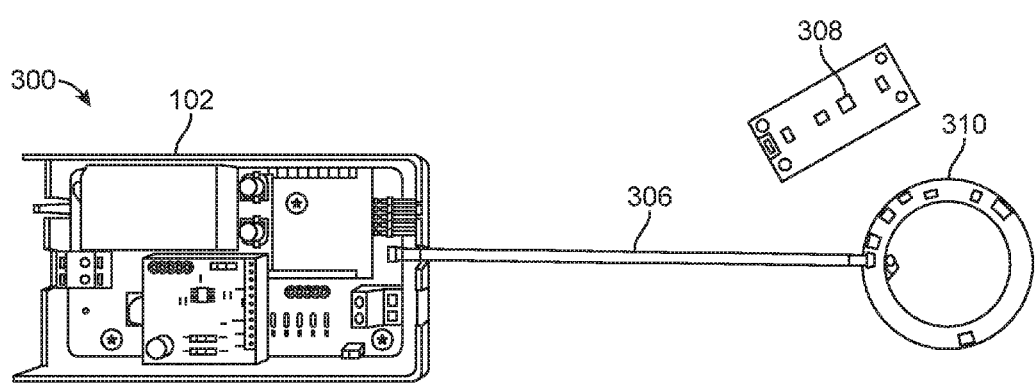
FIG. 3 is a perspective view of a system, illustrating a sensor connection to a luminaire, according to an aspect.

According to an aspect, and as illustrated in FIG. 3, the system 300 may include one or more sensors 308, 310, typically configured as CIS modules, connected to the gateway 102. FIG. 3 illustrates an embodiment that includes at least one of a first CIS module 308 and a second CIS module 310. One or both of the sensors 308, 310 can be connected to the gateway 102. According to an aspect, the CIS modules 308, 310 may include a physical interface 306 with the gateway 102 via a TWSI connection that uses a 6 or 8 pin FPC cable and connector. The CIS modules 308, 310 may be physically connected at any desired position on the luminaire 112 consistent with this disclosure. According to an aspect, the CIS module 308 is a linear module that is adapted to fit on luminaires 112/devices that require a linear fitting. In an embodiment, the CIS module 310 is circular, and may be designed to fit circular-shaped luminaires 112.

In an exemplary embodiment, each of the CIS 308 and CIS 310 sensors include at least two sets of one or more sensors. A first set of sensors or a single sensor (collectively, "environment sensor") may be dedicated to environment sensing, and may be arranged such that it faces away and/or extends in a downward direction from the luminaire 112. According to an aspect, a second set of sensors or a single sensor (collectively, "color sensor" or "Red Green Blue ('RGB') sensor") is arranged such that it faces the luminaire 112 directly. The combination of the environment and color sensors may be combined into a single Application Specific Integrated Circuit (ASIC) or may be arranged as a set of separate devices. According to an aspect, the first and second sets of sensors may also connect with gateway 102. Both sets of sensors may provide real time measurements and assessments to the gateway 102. In response to the measurements and assessments, the gateway 102 may control the dimming control 110 of the luminaire 112, for example by changing the dimming level and/or a color temperature and Red Green Blue/Warm White (RGB/RGBW) color in luminaires that allow for color temperature and RGB/RGBW color control.

According to an aspect, the exemplary system 100 includes the RGB sensor directly facing the luminaire 112. The RGB sensor may measure both the RGB content of a light source and the color/RGB intensity of the light source. Different luminaires in a lighting system may emit different intensities of light and the RGB sensor senses light intensity of each luminaire and provides the light intensity readings to the gateway 102 (and thereby the server 106) for processing data related to the light intensity. According to an aspect, the RGB sensor or combination of sensors is configured to measure multiple color channels.

According to an aspect, the first set of sensors and/or environment sensor may include, for example, a magnetometer 3D sensor to sense and verify correct orientation of the environment sensor. Proper orientation of the environment sensor is required to ensure that the correct direction of environmental factors such as light, movement of objects, and movement of light is sensed. In such fashion, the first set of sensors may be utilized to track objects in the environment in real time.

The environment sensor may be a low resolution imaging sensor, such as an array of sensors combined into a low resolution imaging device, or a single ASIC that is an imaging sensor. According to an aspect, the environment sensor faces away and/or in a downward direction from the luminaire and measures environmental parameters. According to an aspect, the down looking environment sensor includes a low-resolution image sensor, an ambient light sensor, orientation sensor, movement detection sensor and a temperature sensor. In an embodiment, the environment sensor includes several environment sensors. In other words, the environment sensor may include less or more sensors than described herein. Embodiments in accordance with the disclosure can use other sensors and more types of sensors to sense the environment.

According to an aspect, the environment sensor determines movement of light based on the Lucas-Kanade method. The general movement of light is calculated in the Lucas-Kanade method using two images: the current image and the previous image. The difference between the current image and the previous image is calculated by the difference in corresponding pixel values as between the two images. The pixel difference is calculated for each of the pixels in the image and an estimate of the direction of the change in pixel value is calculated using neighboring pixels. The movement direction of each pixel is summarized yielding a total movement direction for the image. So the result of the movement calculation is therefore the general flow of the complete image, not the flow of individual objects in the image. It is an underlying prerequisite for this method that the image frame rate is high enough to ensure that the contents of a pixel has not moved beyond the neighboring pixels; in other words, that the value change of a pixel has been relocated to its neighbors. The movement is calculated as the flow of the pixels in the image that has changed more than the threshold limit. The resulting movement vector is scaled dynamically to be represented by two signed bytes (one for x-direction and one for y-direction). This means that the speed of the flow in the image is not available. A movement detection interrupt is not issued unless three consecutive images show movement. The resulting vector is the average of the three movement vectors. The number of vectors before movement detected is issued can be configured. The multiple sensors and velocity vectors can be tuned up based on feedback provided by the system such as distance between the sensors during lighting installation.

Figure 4:
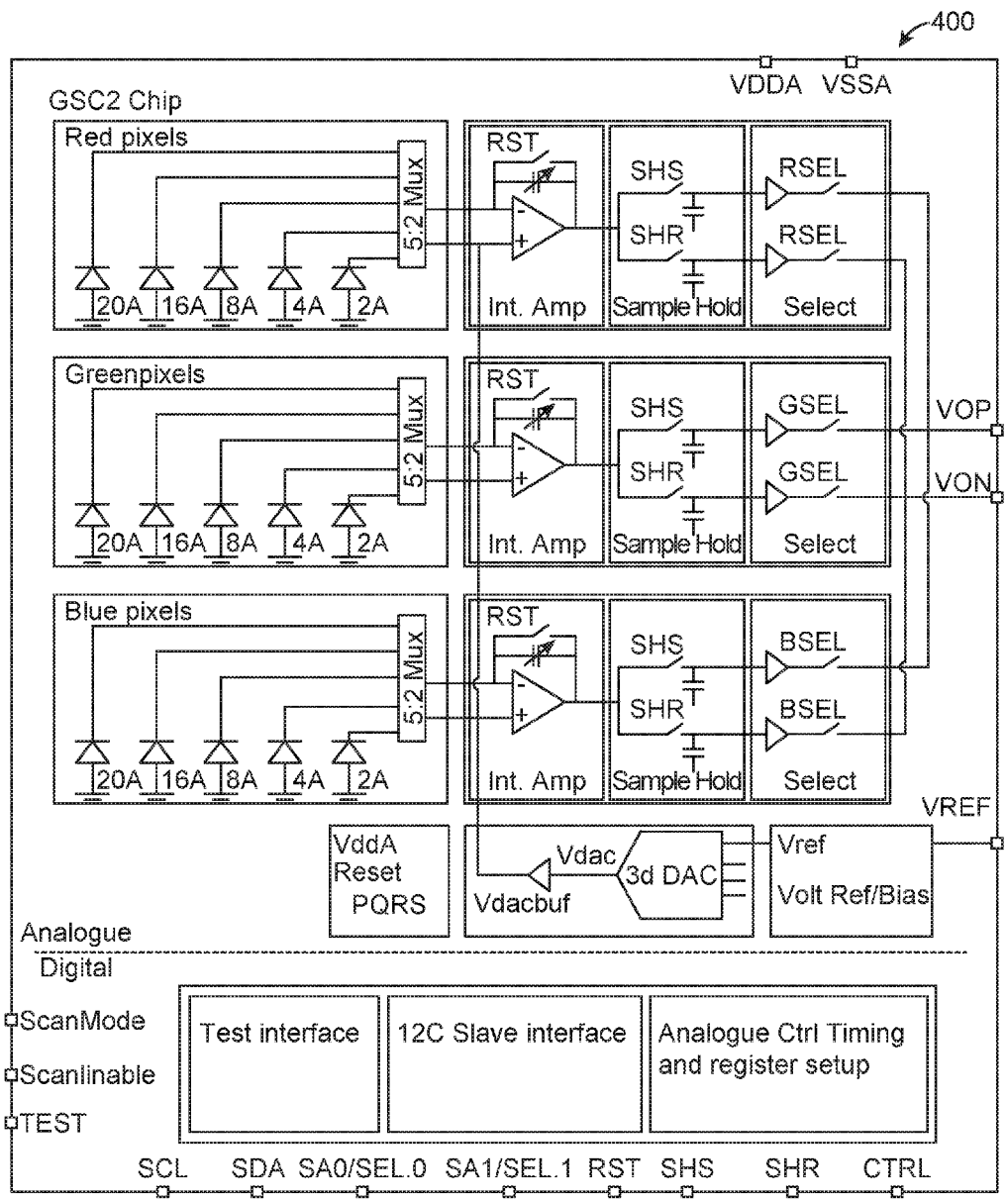
FIG. 4 is a diagram illustrating RGB sensor support chip in measuring RGB content of LED light source, according to an embodiment.

According to an aspect, the combination of the environment sensor and the color sensor is set into one of a single ASIC or a set of separate devices connected to the gateway 102. The sensors may be directed as follows: the color sensor faces the luminaires, and the environment sensor faces away from the luminaires in such a way that it monitors the environment. Real time measurements and assessments may be conveyed to the gateway 102 by the sensors that make up the sensor subsystem 108. The ASIC chip is designed to support the color/RGB sensor in measuring RGB content of LED light source. The color sensor interfaces to the environment sensor and supplies RGB analog signals. The color sensor is a highly configurable analog RGB sensor controlled through an inter-integrated circuit (I2C) interface and a dedicated input. This input is used to control the timing of the amplifiers and sampling circuit. The color sensor has 3 built in integrating amplifiers, Power On Reset (POR), Bias generator, buffered 3 bit digital to analog (DAC) converter, and photodiodes with RGB filters. The color sensor has two analogue outputs OUTP and OUTN which represent the differential output from the selected Red, Green, or Blue channel. This interfaces to the differential programmable gain amplifier (PGA) input of the environment sensor. The chip consists of areas for programmable Red, Green and Blue photodiodes connected to an integrating amplifier each seen FIG. 4. The 3 parallel signal paths make it possible simultaneously to integrate the current from the RGB channels. This ensures that the sampling time is the same for all of Red, Green, and Blue and thereby the ratio between the different channels are as accurate as possible which is important for color temperature calculations (calibration is needed to get the correct ratios). The "CTRL" input is used by a digital state machine to generate the timing control of the integrating amplifiers. A buffered 3 bit DAC supplies a programmable reference voltage to the 3 integrating amplifiers and not used/not selected photo diodes. A Voltage Reference circuit supplies the 3 bit DAC circuit with a stable reference voltage. The POR circuit ensures that the digital circuit is reset and defined during power up and in case the power drops.

Figure 5:
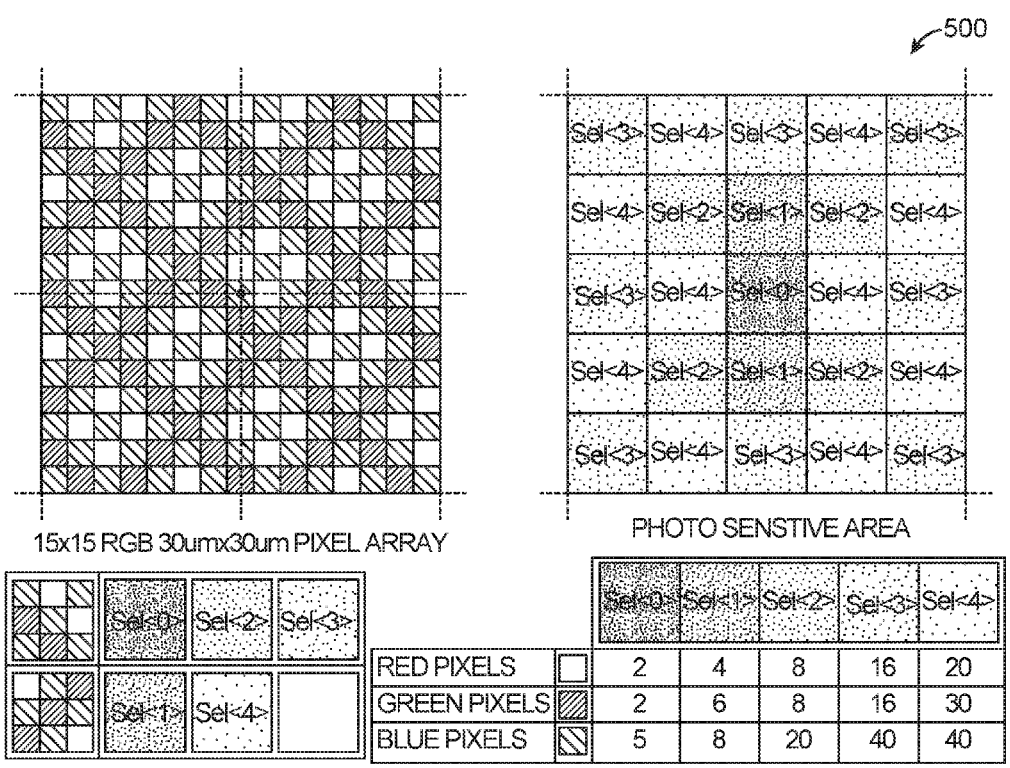
FIG. 5 is a diagram illustrating distribution of RGB pixels in the photo sensitive area of the chip according to an embodiment.

The RGB pixel array is used to measure both the RGB content of a light source and luminous flux. RGB filters and IR cut filters are post-processed on the photodiodes. The distribution of RGB pixels in the photo sensitive area of the chip is shown in FIG. 5. The RGB pixel array consists of 15×15 photodiodes. Pixel size is 30 μm×30 μm with a fill factor around 75%. Each pixel has built-in transmission gate which is controlled by the digital core. The light source is physically in close proximity to the RGB sensor chip. Therefore, the light intensity incident on the photodiodes might be unevenly distributed. To overcome this issue the RGB pixel array are mixed in a certain pattern as shown in top left of FIG. 5. Due to variations in the luminous flux of different light sources and uncertainty in the placement of environment sensor with respect to the light source the photodiode will be subject to a varying amount of illuminance. To cope with this wide dynamic range a programmable number of RGB photodiodes can be multiplexed together. This adds one more degree of freedom in addition to integration time and integration capacitance in the integrating amplifier. Furthermore, the sensitivity of the photodiodes covered with blue filters is around a factor of 3 smaller then for the red and green photodiodes. Therefore, the number of photodiodes covered with blue filter is larger than red and green photodiodes. A factor of 2.5 is exemplary for the permutation it provides between Red, Green and Blue pixels.

According to an aspect, the environment and color sensors of the sensor subsystem 108 are placed/connected on a fitting of the luminaire 112. The exact location of the sensors is not fixed, e.g., two different luminaires by the same manufacturer of the same type of fitting and LED specifications may be assembled such that the sensor location is different relative to the surface and dimensions of the fitting. Thus, the location of the color and environment sensors on the fitting is not limited.

Figure 6:
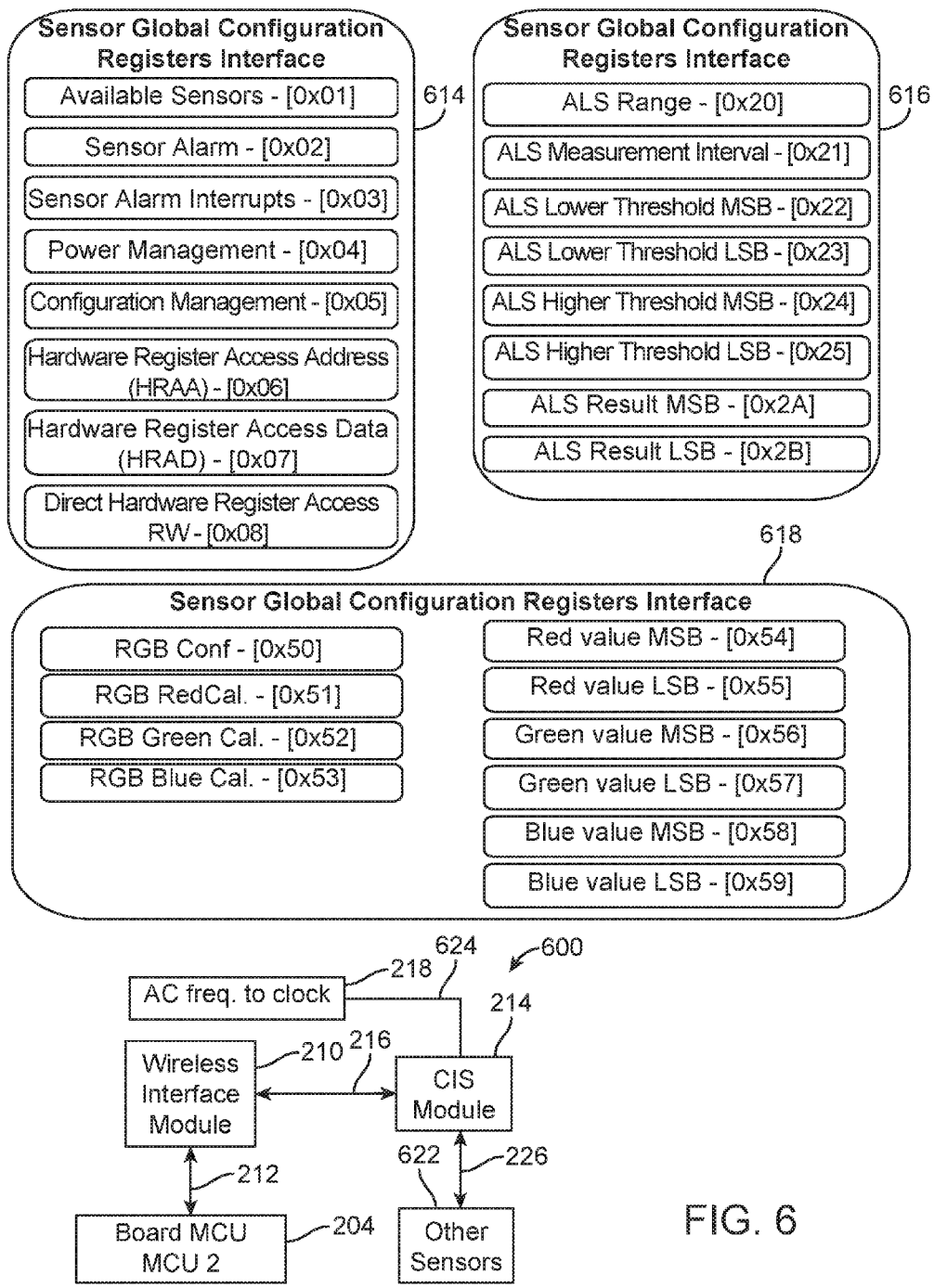
FIG. 6 is a diagram illustrating a type of information/data structure that is receivable by a sensor interface of a system, according to an embodiment.

FIG. 6 illustrates an embodiment of a sensor interface data structure 600. According to an aspect, the sensor interface is the TWSI 216 that allows the use of memory mapped registers to communicate information between the WIM 210 and the CIS module 214. In turn, the WIM 210 may provide this information and receive directives from the Board MCU-MCU 2 204 via a SPI bus 212. The sensor module interface 212 may be distinct for each of the particular sensor devices 600 used in various configurations. As illustrated in FIG. 6, and according to an aspect, the sensor devices 600 may include multiple registers associated with any/all of its functions. FIG. 6 depicts some of the features to exemplify the data structure. In an embodiment, the interface 216, 226 with the sensor device is an array of eight bit (8-bit) registers (see, for instance, Sensor Global Configuration Register Interfaces 614 and 616). Each may be mapped to a specific memory address on the WIM 210. In an embodiment, a plurality of interfaces 614, 616, 618 is provided to control the sensors 600. In the exemplary embodiment of FIG. 6, an example of a register, such as a Sensor Global Configuration Register Interface 614 is illustrated. The Sensor Global Configuration Register Interface 614 may be set as follows: the register in address 0x01 will turn on bits associated with available sensors on the module. If a sensor does not exist, its bit may be set to 0. Available sensors in this embodiment may be: Ambient Light Sensor ("ALS"), Motion detection based on passive infrared ("PIR"), RGB sensor ("RGB"), Motion detection and direction based on frame capture ("MOT"), LED Lumen sensor ("LL"), and Temperature sensor ("TEMP"). According to an aspect, the register address 0x02 is used as an alarm for the different sensors; e.g., one can set the value range so that when reached by the specific sensor the appropriate alarm bit in this register will turn to 1, or else it is 0. The register in address 0x03 may be used for resetting sensor alarms when this occurs. According to an aspect, the register in address 0x04 is used to power ON and/or OFF the entire sensors' system. The register in address 0x05 may be used for configuration management. Typical registers can be found in register addresses found in 0x06-0x08, as well as 0x20-0x28 and 0x50-0x59. Additional sensors would expand (or constrict) the registers.

Figure 7:
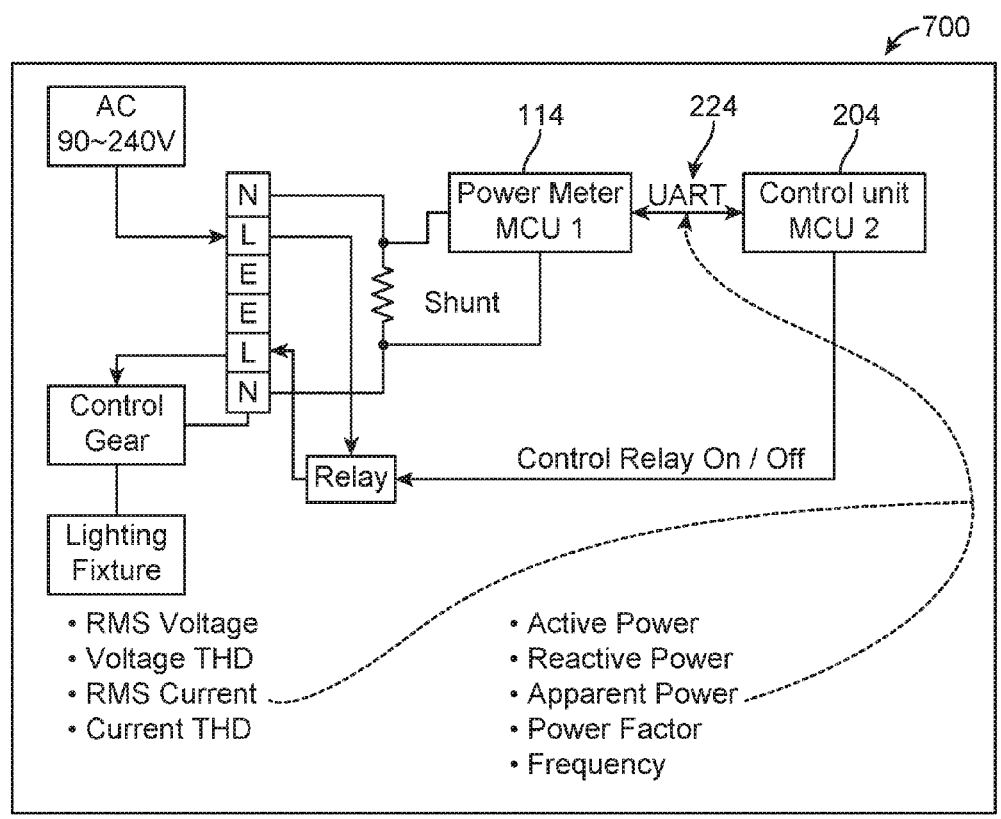
FIG. 7 is a diagram illustrating another type of information/data structure that is receivable over a power meter interface of a system, according to an embodiment.

FIG. 7 illustrates an exemplary embodiment 700 of a power meter 114 which may be used in the system 100. The power meter 114 may be any kind of known power meter consistent with this disclosure. According to an aspect, the power meter 114 may be physically connected with and/or have physical connectivity within the USLG 102 (see, for example, FIG. 1). In one embodiment, the list of information that is communicated by the power meter 114 via the UART includes: RMS Voltage, Voltage THD, RMS current, Current THD, Active Power, Reactive power, Apparent power, Power factor, and Frequency. Various mixed signal microcontrollers 204, such as those sold by Texas Instruments under the Manufacturer's Code "MSP430I2041" may be used by the system 100 and are able to communicate with the power meter 114.

Figure 8A:
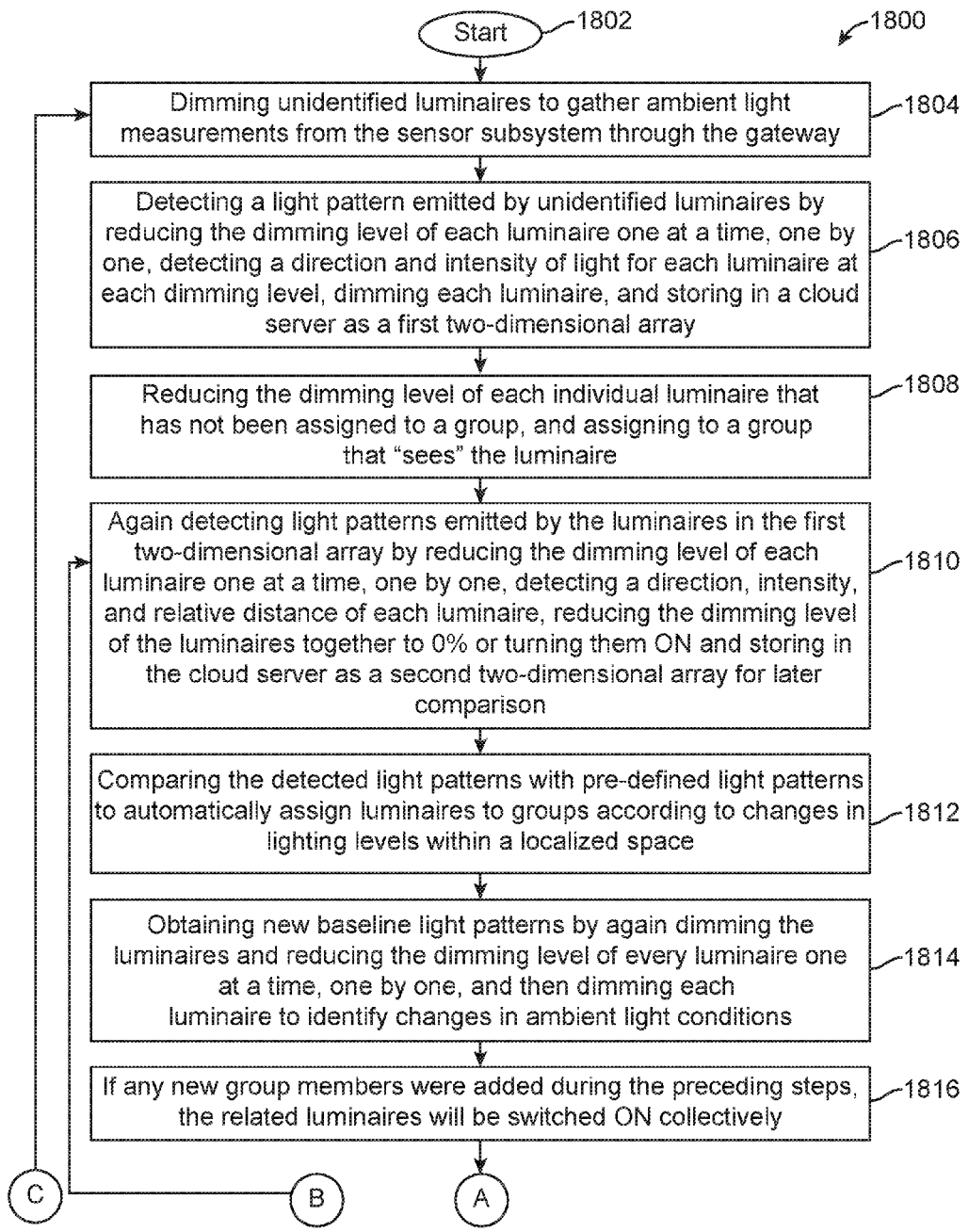
FIG. 8A is a flow chart illustrating an exemplary embodiment of a luminaire location identification method.
Figure 8B:
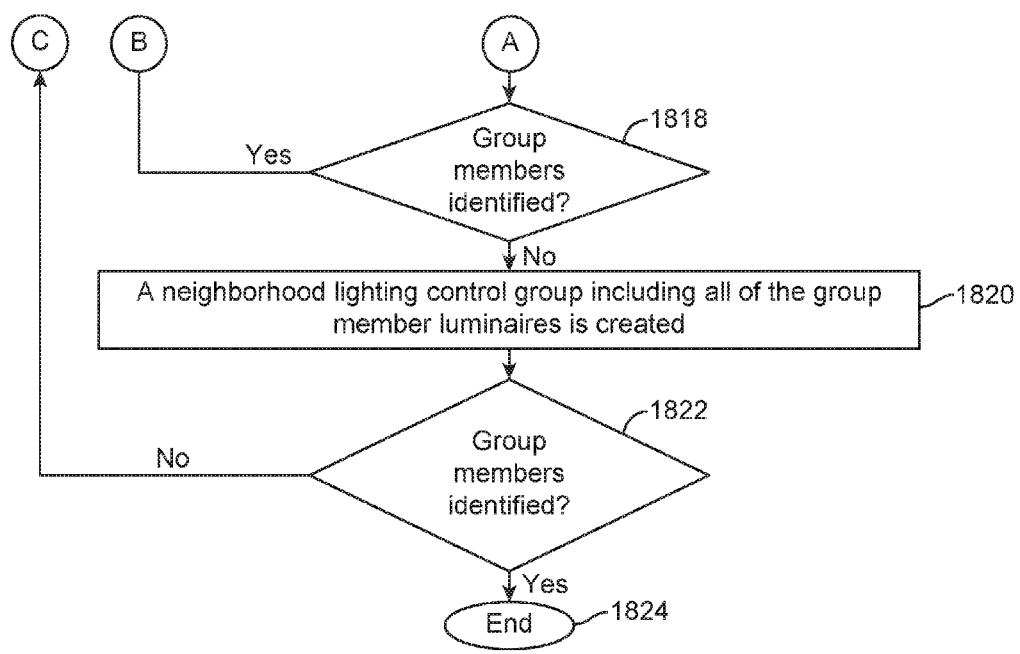
FIG. 8B is a continuation of FIG. 8A.

In general, aspects of the disclosure describe a method of automatic luminaire location identification (e.g., by unique network addresses) for commissioning a lighting control system. Further, this disclosure relates to automated commissioning process resulting in correct positioning of each luminaire device to the correct floor plan location and assigning each luminaire device to the correct location within a focused area. FIGS. 8A and 8B illustrate an exemplary embodiment of a method 1800 for automated luminaire identification and commissioning in a lighting control system according to the disclosure. According to an aspect, a system 100 (such as shown in FIG. 1) is configured to perform various high-level system operations 1802 for automatic luminaire identification and group assignment. The exemplary method detects whether a subject luminaire is illuminated by sensing with sensor systems associated with the one or more neighboring luminaires light output from the subject luminaire. According to an aspect, at step 1802, initialization of the system operations begin. At step 1804, luminaires that have not been identified (i.e., detected and/or assigned to a location or designation) are dimmed to gather information regarding baseline ambient light levels. In the exemplary embodiment, only the controlled luminaires are turned off and the ambient light is any light that exists from, for example, non-controlled luminaires, sunlight, and/or other extrinsic sources. In other embodiments, any or all light sources may be manipulated to establish baseline light levels as long as the conditions are kept consistent for the comparison (error check) between ambient light levels at different points in time as described further below. The sensor subsystem measures the ambient light levels.

At step 1806, a baseline light pattern relating to the unidentified luminaires is obtained by reducing the dimming level of each luminaire one at a time, detecting with the environment sensor a direction and intensity of light for each luminaire at each dimming level, dimming each luminaire again, and storing the direction and intensity of light and corresponding dimming level as a light pattern in a first two-dimensional array for later comparison. The two-dimensional array may also include, for example and without limitation, the unique network address of each gateway associated with the unidentified luminaires, ambient light intensity values which may include light from other light sources including other luminaires that are not controlled by the system, and the ON/OFF state of each luminaire. The information is stored in the two-dimensional array for each dimming level of the luminaire.

At step 1808, each individual luminaire in the first two-dimensional array that has not been assigned to a neighborhood group of luminaires is selected by a user or at random by the system and the dimming level of the selected luminaire is reduced. The selected luminaire is then assigned as a member of the next available neighborhood lighting control group (e.g., according to neighborhood control group identification numbers where '0' represents unassigned) having luminaires that "see" the selected luminaire via their associated sensor subsystems, and the first two-dimensional array is updated with the group assignment for each luminaire in the first two-dimensional array.

At step 1810, another iteration of light pattern detection is performed by dimming the luminaires in the first two-dimensional array, reducing the dimming level of each luminaire one at a time, detecting with a sensor subsystem a direction and instensity of light for each luminaire at each dimming level, reducing the dimming level of all of the luminaires together to 0% or turning them ON, and storing the direction and light intensity of each luminaire at each dimming level as a light pattern in a second two-dimensional array having a similar structure as the first, baseline two-dimensional array, for later comparison. The second two-dimensional array also includes information regarding a relative distance of each illuminated luminaire from the sensor subsystems that are detecting it based on actual light intensity from the illuminated luminaire and/or the wireless signal strength from a gateway associated with the illuminated luminaire. In the exemplary embodiment shown in FIG. 8A, the up looking (color) sensor on the illuminated luminaire is used to gauge the relative distance of that luminaire from the sensor subsystems detecting it by measuring the light intensity from the luminaire as the dimming level is reduced. The light intensity measured by the up looking sensor can be compared with the light intensity detected by the sensor subsystems detecting it, and the difference between the intensities can be used to determine a relative distance of the illuminated luminaire from the sensor subsystem. For example, if the sensor subsystem detects a relatively low light intensity from an illuminated luminaire even though the up looking sensor for that luminaire is measuring a relatively high intensity, it can be inferred that the illuminated luminaire is relatively far from the sensor subsystem. In other embodiments the relative distance of the illuminated luminaire may be determined by measuring at a detecting sensor subsystem the wireless (e.g., Mesh BLE) signal strength from the gateway of the illuminated luminaire as described further below with respect to FIG. 8D.

Figure 8C:
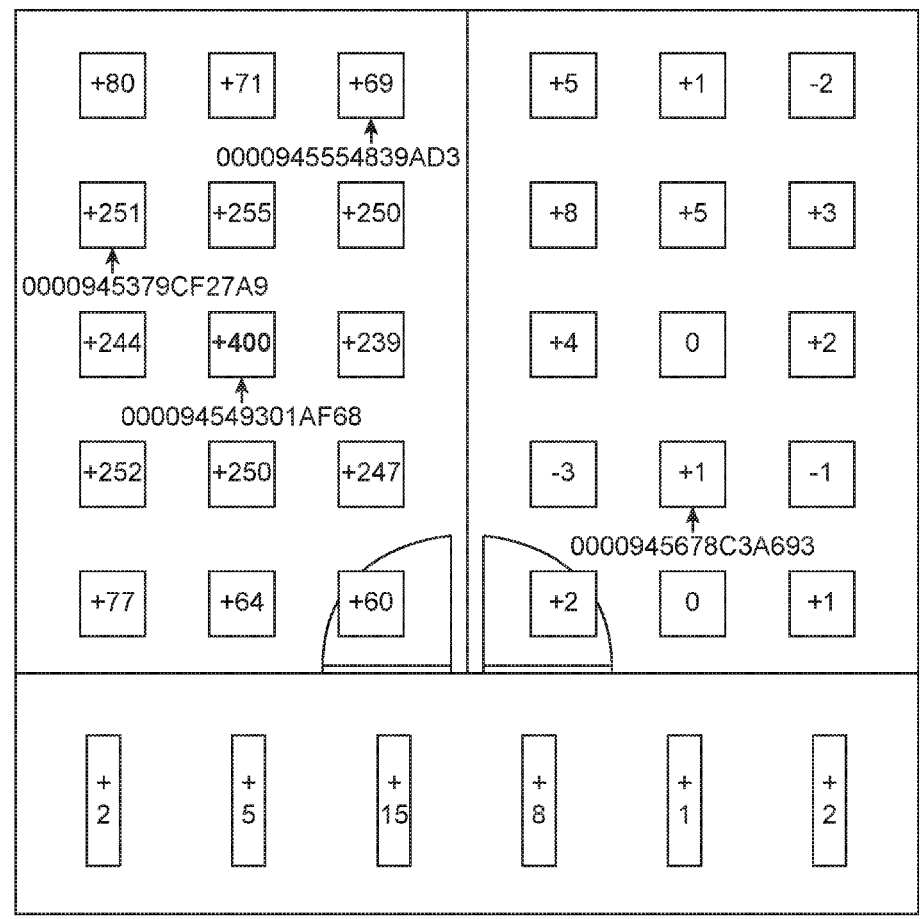
FIG. 8C is a diagram illustrating comparison of sensor readings with baseline readings according to an aspect.

At step 1812 a comparison is made with between the first and second two-dimensional arrays and baseline ambient light readings/patterns as further represented in FIG. 8C. The difference between baseline ambient light levels and current light levels (according to light patterns derived from the first and second two-dimensional arrays) detected by each respective sensor is calculated and if a defined threshold (e.g., difference >=150 lumens (lm)) is exceeded by one or more sensors for a particular illuminated luminaire, it is assumed that the illuminated luminaire and luminaire(s) of the associated sensors are within the same localized space and can be assigned to the current or next available neighborhood control group. In such fashion, the exemplary system and method detects whether an illuminated luminaire is in proximity to another luminaire.

At step 1814, new baseline ambient light and light pattern readings are taken by dimming all luminaires in the array to 100% or switching them OFF and reducing the dimming level of each luminaire one at a time, and then dimming the luminaire to 100% or turning it OFF to verify for any changes in natural light ingress, etc., to minimize erroneous comparisons. This is effectively an error check to determine whether the same light patterns are detected as at the beginning of the process. If not, the ambient conditions have changed and the process should be restarted at step 1806.

At step 1816, if any new group members were added during the preceding steps, the dimming level of the entire neighborhood group to which the new luminaire was added is reduced 0% or the luminaires are switched ON (100% output) to get an updated light pattern of the entire group. At step 1818, steps 1810 to 1816 are repeated until no further group members are identified in 3 subsequent passes, in an exemplary embodiment, or a manually defined membership limit for a neighborhood group has been met or exceeded. At step 1820, a lighting control group ("neighborhood" group) is created consisting of all of the group member luminaire identifications as depict in FIGS. 8D and 9. Luminaire identifications may be any arbitrarily assigned numbers, letters, location descriptions, or any other scheme that is capable of assigning a unique luminaire identification to each luminaire in the lighting system. In the event that the membership limit for a neighborhood group has been met or exceeded, overflow luminaires may form a new group.

At step 1822, steps 1802 to 1820 are repeated until all identified luminaries are assigned to a neighborhood group or the process is aborted. If all identified luminaries are assigned to a neighborhood group then the process ends at step 1824. The exemplary method may further comprise assigning the luminaires to lighting control groups based on relative locations of luminaires in the system map. The method may further comprise reducing the dimming level to 0% and then dimming to 100%, or switching ON/OFF, of the newly created groups as a collective entity to determine physical location of the group within the installed environment. In an aspect, the two-dimensional array includes the network identification of each gateway, ambient light intensity values, ON/OFF state of each luminaire, dimming level of each luminaire, and neighborhood group identification. Due to ambient lighting levels relating to daylight ingress, the disclosed method may advantageously be at its most efficient during hours of reduced external light although the current devices, systems, and methods are not limited by such conditions.

In certain exemplary embodiments, the light patterns emitted by the unidentified luminaires described above are detected by an environment sensor or set of sensors including an array of 15×15 or 32×32 pixels and employing a reversed motion algorithm such as Lucas-Kanade motion estimation. Other image sensors and/or motion estimation may be used within the scope of this disclosure. The environment sensor or set of sensors may further comprise a magnetometer 2D/3D sensor to maintain proper orientation of the environment sensor and ensure that the correction direction of light, objects, people, etc. and associated motions are being detected. As the dimming level of each luminaire is decreased according to the exemplary process described with respect to FIGS. 8A-8B, environment sensors that "see" a lit luminaire will detect the movement of light from the luminaire as the dimming level is decreased. The movement of light can be used, e.g., by the servers in the system, to derive a relative direction of the luminaire from the environment sensor.

In an aspect, a final manual group identification process may be necessary to determine the actual physical location of the group within the installed environment. This can be done by winking or switching ON/OFF any of the newly created lighting control groups ('neighborhood' groups) as a collective entity. Thus, a group may be created based on the luminaires seen during the group wink and without knowing the location of the group, or a location of the group may be determined without knowing the actual group members based on the observed area of light intensity during the group wink. Additional information, such as the network identification of each gateway associated with each luminaire group member, can also be utilized to narrow down the location of these groups for final identification.

Figure 8D:
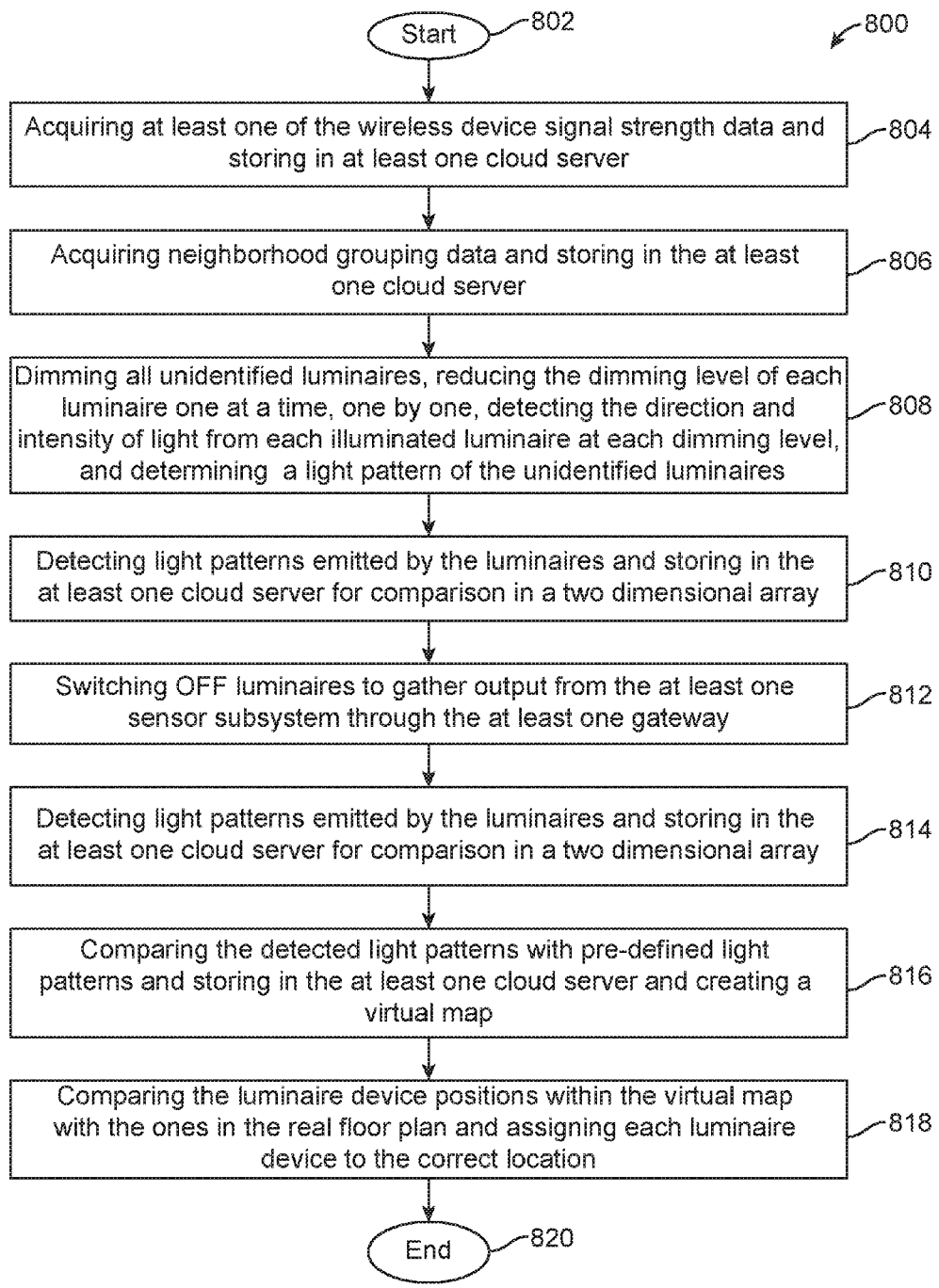
FIG. 8D is a flow chart illustrating automatic luminaire location identification for commissioning a lighting control system according to an aspect.

FIG. 8D illustrates a flow chart of an aspect and exemplary method 800 of a system 100. According to an aspect, system 100 is configured to perform various high-level system operations 802 via the server 106 (see FIG. 1), and in particular is configured to perform automatic luminaire location identification for commissioning a lighting control system within an enclosed environment. The method includes, at step 804, acquiring at least one wireless device signal strength data from a broadcasting gateway in proximity to a receiving gateway that detects the wireless signal of the broadcasting gateway and storing the wireless signal strength in a cloud server 106. At step 806, acquiring neighborhood group data based on the relative directions and proximities of luminaires in the first two-dimensional array and storing in the cloud server 106. At step 808, dimming all unidentified luminaires, reducing the dimming level of each unidentified luminaire one at a time, detecting the direction and intensity of light from each illuminated luminaire at every dimming level, reducing the dimming level of each luminaire, and switching ON together all unidentified luminaires. At step 810, detecting with a sensor subsystem the light pattern emitted by the unidentified luminaires and storing the light pattern in the cloud server 106 as a two-dimensional array for comparison. At step 812, luminaires are switched OFF to measure with the sensor subsystem ambient light conditions. At step 814, performing another iteration of detecting light patterns emitted by the luminaires is as described above with respect to FIG. 8A and storing the light pattern as a second two-dimensional array in the cloud server 106 for later comparison. The second two-dimensional array further includes the wireless signal strength detected by each sensor subsystem/gateway for each gateway associated with an illuminated luminaire.

The detected light patterns in the two-dimensional arrays are compared to each other and to pre-defined (ambient) light patterns to create a virtual map according to the relative direction and distance between luminaires as determined by sensor measurements of the direction and wireless signal strength of each illuminated luminaire. At step 818, the luminaire device positions are compared within the virtual map with the ones in the real floor plan and each luminaire is assigned to an actual device location according to the floor plan. In an embodiment, the light patterns emitted by the luminaires are detected by using at least one environment sensor including an array of 32×32 pixels or 15×15 pixels and reversed motion algorithm. The process is to reverse polarity on the sensor and execute a Lucas-Kanade algorithm to identify light intensity change, i.e., detecting movement of light instead of dark areas, and gradually reduce the dimming level of each luminaire one at a time and monitor the direction of the received light at other luminaires that "see" the lit luminaire via their associated environment sensors. Selecting a single gateway and increasing the light of the luminaire attached to from 0 to max provides an increasing intensity coming from the specific direction of the luminaire. Measurements regarding the movement of light are communicated to the cloud server 106. Thus, a location identification for the selected luminaire may be created without knowing a specific group because a direction of the luminaire relative to neighboring luminaires and relative distance based on wireless signal strength can be determined.

In an aspect, the method further comprises comparing the detected light patterns with pre-defined light patterns to automatically map neighborhood lighting control groups via the localized changes in lighting levels within a focused area and obtaining new baseline light patterns by again switching OFF the luminaires to verify changes in natural light ingress to minimize erroneous comparisons. When one or more new lighting control groups were added, the related luminaires are switched ON collectively thereby creating a lighting control group which includes one or more identified luminaires. The method further comprises assigning each luminaire to a lighting control group based on the identified, relative location of the luminaire in the map.

Figure 9:
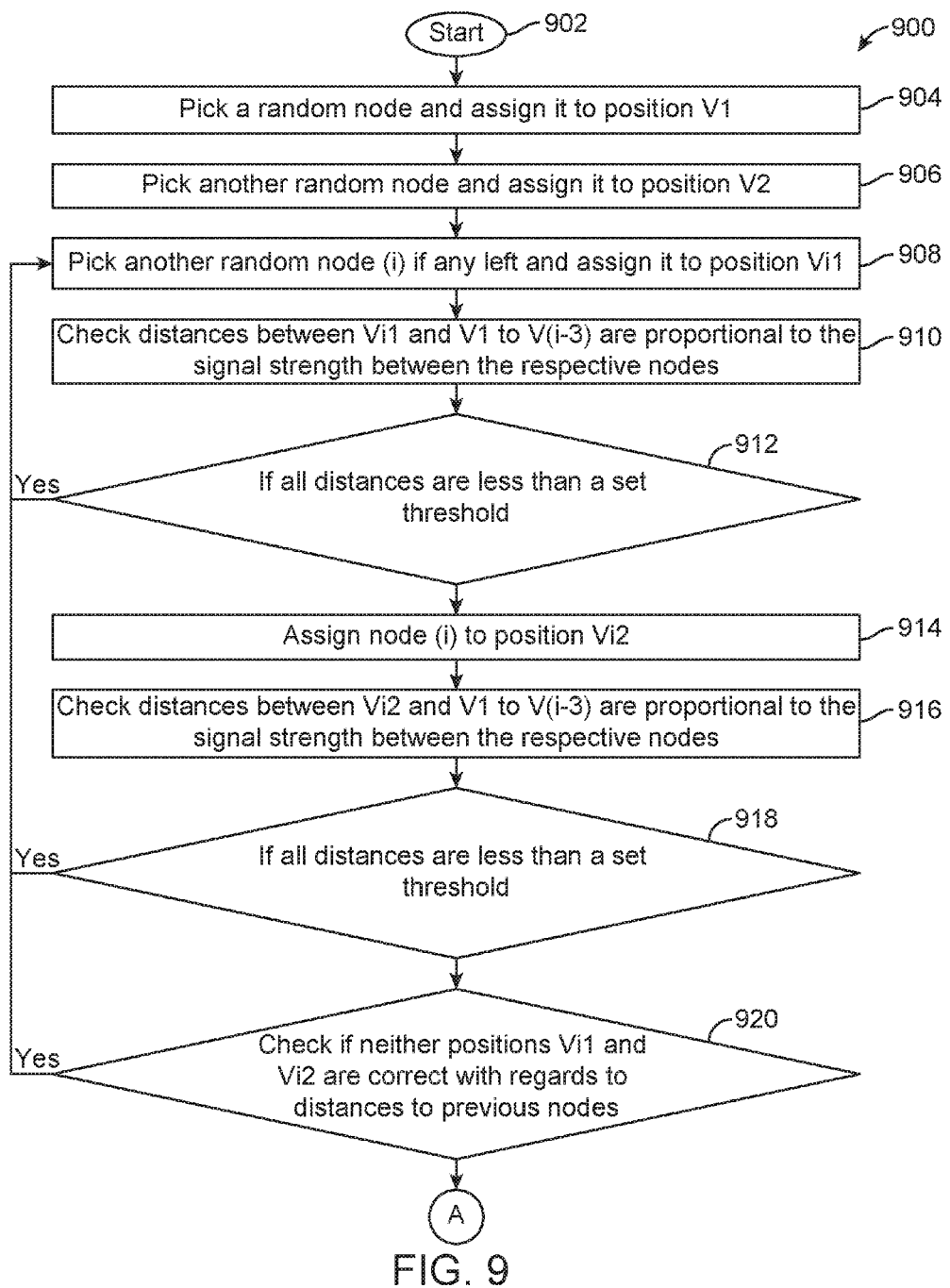
FIG. 9 is a flow chart illustrating creating virtual map according to an aspect.
Figure 9A:
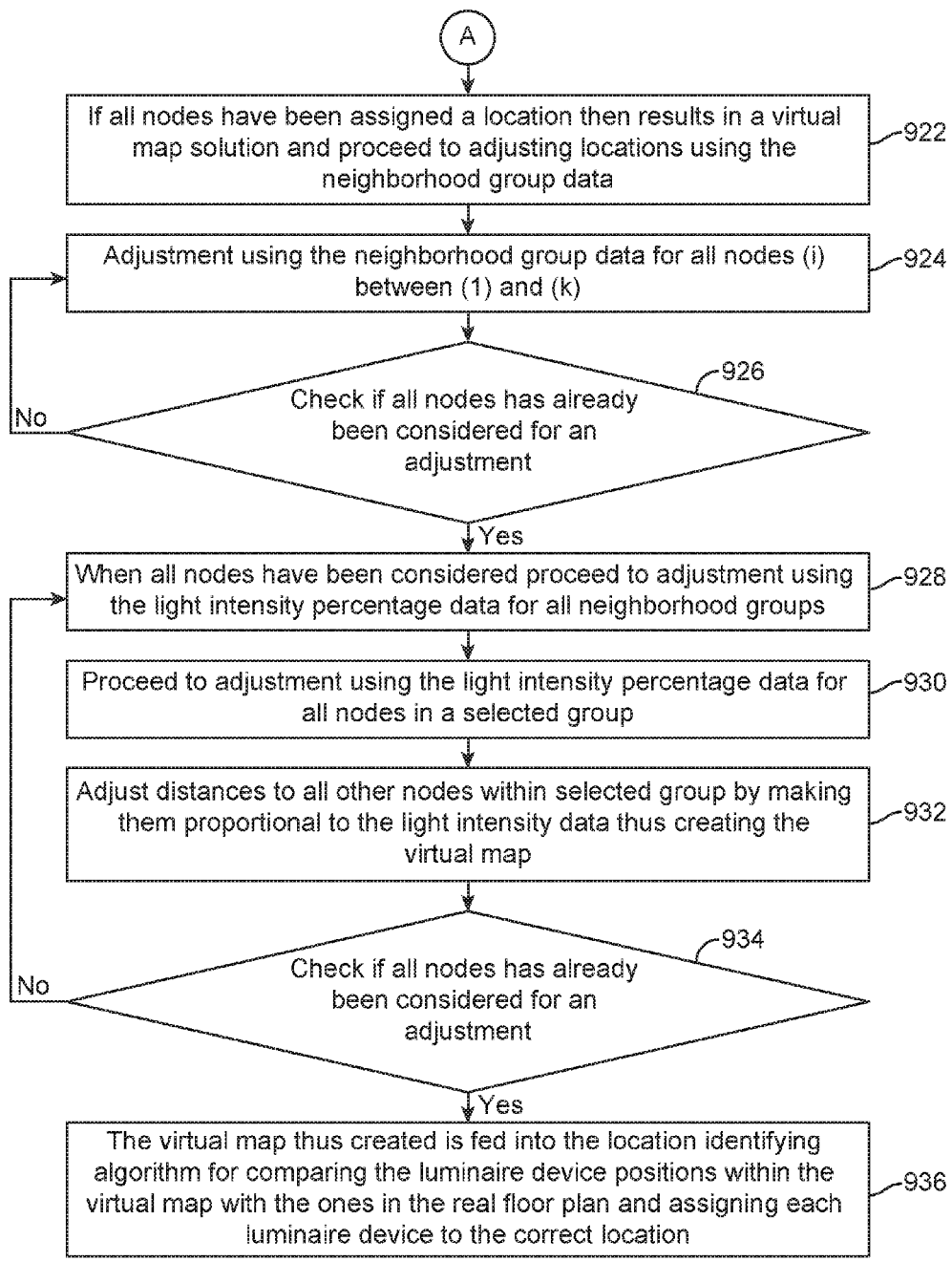
FIG. 9A is continuation of the flow chart shown in FIG. 9.
Figure 10:
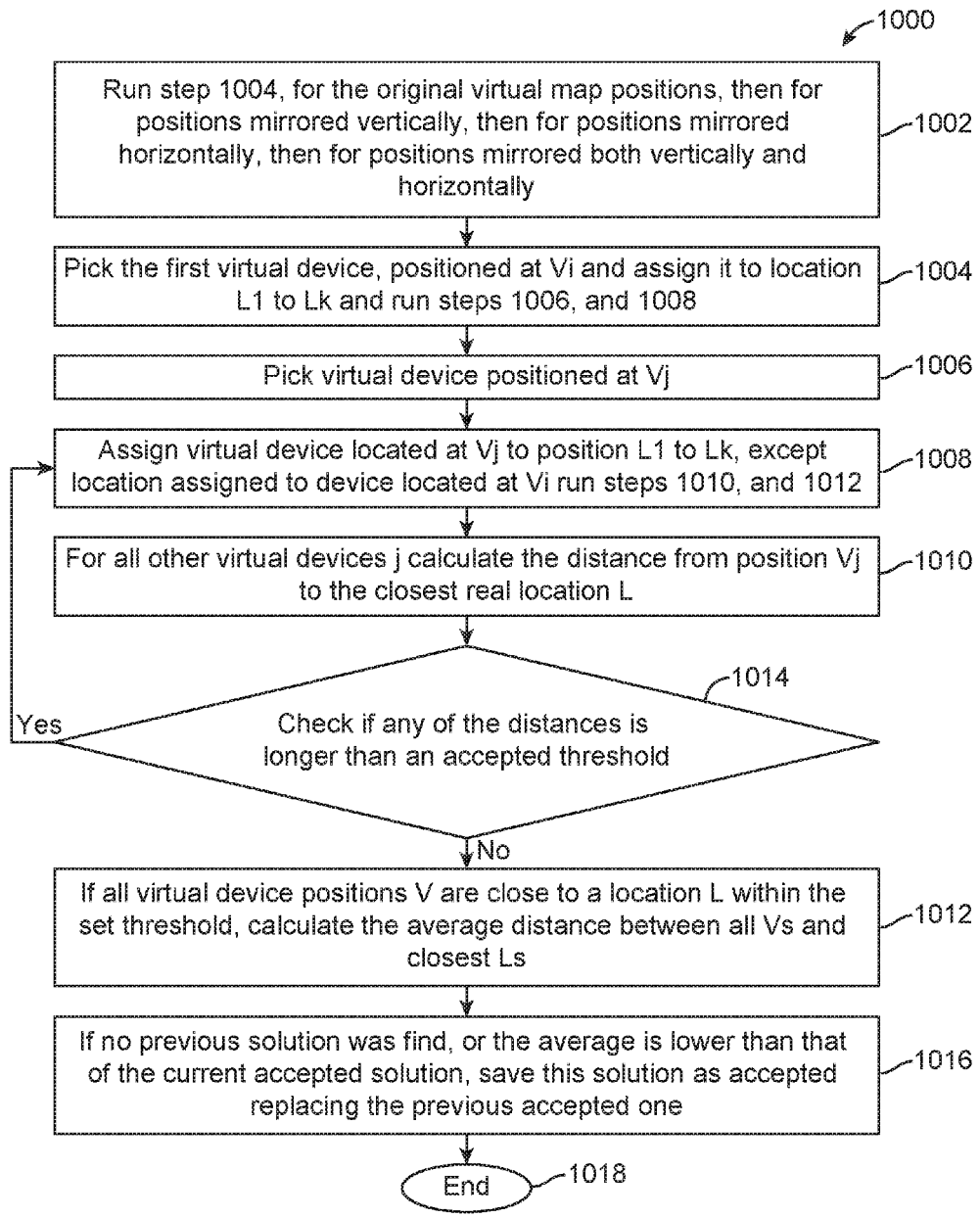
FIG. 10 is a flow chart illustrating comparing the luminaire device positions within the virtual map with the ones in the real floor plan and assigning each luminaire device to the correct location according to an aspect.

FIGS. 9 and 9A illustrate a flow chart of an aspect and a method 900 of a system 100. In an aspect, the disclosure relates to a method of creating virtual map where each luminaire position is calculated based on other luminaire positions. The virtual map is created using the outputs of three processes namely: an array of signal strength readings between any pair of two luminaires, the calculated neighborhood group of each luminaire and an array of the light intensity reading (as percentage) for any pair of two luminaires. At step 904, pick a random luminaire and assign it to position V1. At step 906, pick another random luminaire and assign it to position V2, where V2 is proportional with the signal strength measured between the two points. At step 908, pick another random luminaire (i) if any left and assign it to position Vi1, where Vi1 is the first point of intersection between possible luminaire i location spaces based on distances to V(i-2) and V(i-1). At step 910, check distances between Vi1 and V1 to V(i-3) are proportional to the signal strength between the respective luminaires. At step 912, if all distances are less than a set threshold, go back to step 908 considering luminaire (i+1). At step 914, assign luminaire (i) to position Vi2, where Vi2 is the second point of intersection between possible luminaire (i) location spaces based on distances to V(i-2) and V(i-1). At step 916, check distances between Vi2 and V1 to V(i-3) are proportional to the signal strength between the respective luminaires. At step 918, if all distances are less than a set threshold, go back to step 908 considering luminaire (i+1). At step 920, if neither positions Vi1 and Vi2 are correct with regards to distances to previous luminaires return to step 908 for luminaire (i-1) and continue using next possible location. At step 922, if all luminaires have been assigned a location then results in a virtual map solution and proceed to adjusting locations using the neighborhood group data. At step 924, adjustment using the neighborhood group data for all luminaires (i) between (l) and (k), if luminaire (i) adjust Vi by reducing the distance to all luminaires on different neighborhood groups by a predefined factor. At step 926, check if all luminaires have already been considered for an adjustment. If no go to step 924. At step 928, when all luminaires have been considered, proceed to adjustment using the light intensity percentage data for all neighborhood groups. At step 930, adjustment using the light intensity percentage data for all luminaires in a selected group, and at step 932, adjustment using the light intensity percentage data to adjust relative distances to all other luminaires within selected group by making them proportional to the light intensity data thus creating the virtual map. At step 934, check if all luminaires has already been considered for an adjustment. If no go to step 928. At step 936, the virtual map thus created is fed into the location identifying algorithm for comparing the luminaire device positions within the virtual map with the ones in the real floor plan and assigning each luminaire device to the correct location. FIG. 10 is a flowchart illustrating comparing the luminaire device positions within the virtual map with the ones in the real floor plan and assigning each luminaire device to the correct location. Consider the virtual map positions V1, V2, . . . Vk, and real map locations L1, L2, . . . Lk, where k is the number of luminaries. At step 1002, run step 1004, for the original virtual map positions, then for positions mirrored vertically, then for positions mirrored horizontally, then for positions mirrored both vertically and horizontally. At step 1004, pick the first virtual device, positioned at Vi and assign it to location L1 to Lk and run steps 1006, and 1008. At step 1006, pick virtual device positioned at Vj, where i is calculated so the distance between the first virtual devices Vi and device located at Vj is the closest to the average of distances between Vi and all other device locations. At step 1008, assign virtual device located at Vj to position L1 to Lk, except location assigned to device located at Vi run steps 1010, and 1012. At step 1010, for all other virtual devices j calculate the distance from position Vj to the closest real location L. At step 1014, check if any of the distances is longer than an accepted threshold, if yes stop and return to step 1008. At step 1012, if all virtual device positions V are close to a location L within the set threshold, calculate the average distance between all Vs and closest Ls. At step 1016, if no previous solution was find, or the average is lower than that of the current accepted solution, save this solution as accepted replacing the previous accepted one.

Figures 11, 12, 13:
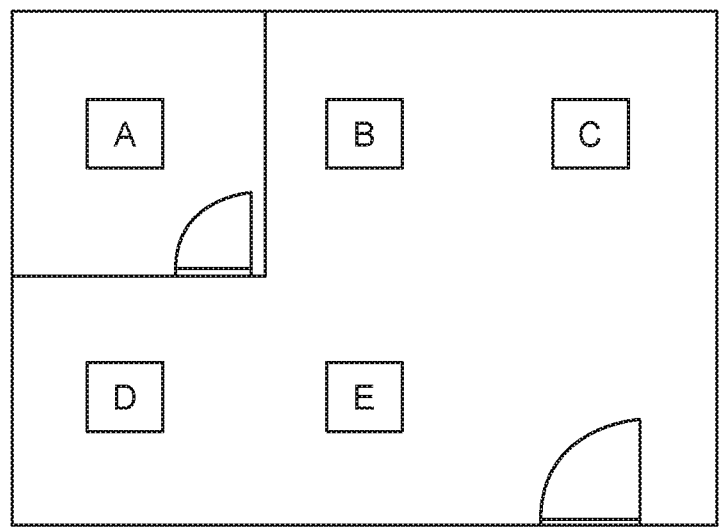
FIG. 11 is a diagram illustrating automated commissioning process resulting in correct positioning of each luminaire device according to an illustration.
FIG. 12 is a diagram illustrating process of acquiring wireless device signal strength data according to an illustration.
FIG. 13 is a diagram illustrating process of acquiring neighborhood grouping data according to an illustration.

The method of automated commissioning process resulting in correct positioning of each luminaire device to the correct floor plan location and assigning each luminaire device to the correct location within a focused area is herein described with the following illustration with reference to FIG. 11. FIG. 11 shows locations of luminaires A-E. In FIG. 12, the wireless signal strength detected between each pair of luminaires A-E is detected. As shown, wireless signal strengths are generally stronger between luminaires B-E, indicating that device A is in another location or room, potentially obscured by walls. Thus, as shown in FIG. 13, device A is assigned to a first group, Group 1, while devices B-E are assigned to a second group, Group 2. Similarly, in FIG. 14, ambient light detection between each luminaire is detected and, as expected, ambient light as between devices B-E is seen while device A's light is only perceived by devices D and E, outside the door of the room in which device A sits. Based on the above information a virtual map of relative device locations (such as in FIG. 11) may be generated.

Figure 17:
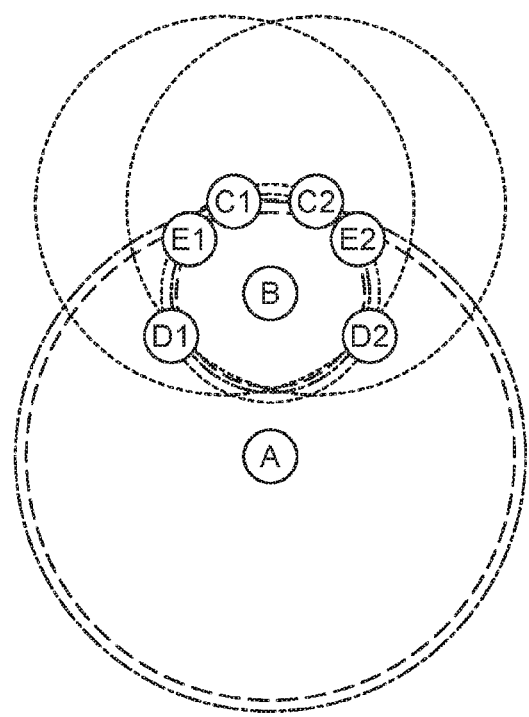
FIG. 17 is a diagram illustrating correct locations for devices C and D according to an illustration.
Figure 18:
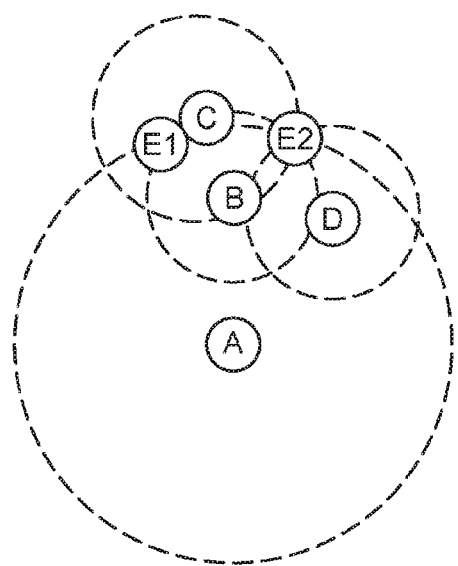
FIG. 18 is a diagram illustrating location of E2 according to an illustration.
Figure 19:
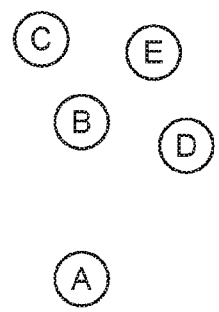
FIG. 19 is a diagram illustrating creation of virtual map according to an illustration.

Considering u as a basic distance unit, all other devices will be placed in a range of a length that is a multiple u, proportional to the signal strength as recorded by device A. The possible locations of devices B-E should be considered as shown in FIG. 15. Place the second device on a random position within the correct range to device A. This leads to finding possible positions of devices C-E based on their range to device B. Devices C-E can only be at the intersection of possible positions in relation to A with the possible positions in relation to B. As such, device C can only be in one of the two C1 and C2 positions, while device D and E can be located in a similar manner as shown in FIG. 16. With devices A and B provisionally placed and only 2 possibilities for devices C, D and E, to filter incorrect possibilities for devices C-E. Consider the possible location of device D in relation to locations C1 and C2 and check whether either possibilities D1 and D2 is a match. The result here is that only C1 and D2 are matching previous selected locations for A and B. Hence they are the correct locations for devices C and D as shown in FIG. 17. The device D location is alone left to find, and it can be one of E1 and E2. Knowing the locations of C and D, the information related to range of E from C and D can be used and it is found that only one of the possibilities E1 and E2 can be a match, in this case is E2 as shown in FIG. 18. Based on the signal strength data a virtual map is created as shown in FIG. 19.

One of the factors that could affect the signal strength data is obstructions where the same can be overcome by using neighborhood group data. Based on the data, it is shown that device A to be in a different group than all the others.

Figure 20:
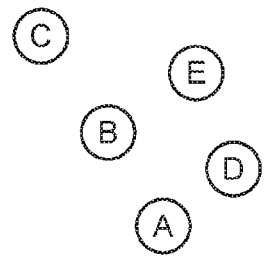
FIG. 20 is a diagram illustrating process of acquiring neighborhood grouping data according to an illustration.
Figure 21:
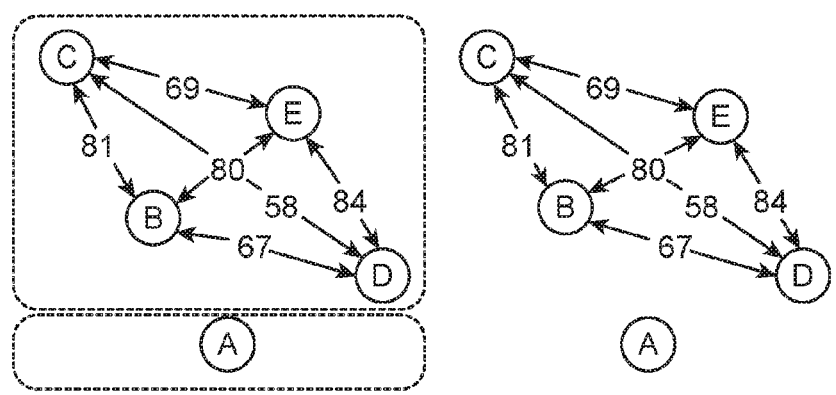
FIG. 21 is a diagram illustrating overcoming of obstructions in signal strength data by using neighborhood group data according to an illustration.
Figure 22:
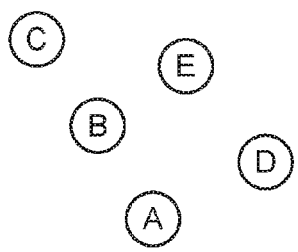
FIG. 22 is a diagram illustrating creation of virtual map according to an illustration.

Assuming it is in a different location, and the signal strength readings are showing a longer distance than it should be. The distances between A and the rest are shortened by a factor k, where k is a predefined constant. The result is as shown in FIG. 20. The precision of location data is increased using light level percentage data. It is known that device A is in a different room, or not local to the other devices. However, devices B-E are in the same group and hence their respective ambient light data can be used to alter their presumptive locations as shown in FIG. 21. The virtual map as resulted from analyzing signal strength, neighborhood data grouping and ambient light data sets is shown in FIG. 22. After creating a virtual map, where all luminaire devices are located correctly relative to each other, the luminaire device positions are compared within the virtual map with the ones in the real floor plan and then assigning each luminaire device to the correct location using location identifying algorithm. Accordingly, light level percentage data, for example, as disclosed in the exemplary embodiments of lighting control using dimming functions, may both obviate and compensate for shortcomings in lighting control identification and grouping techniques which rely upon signal strength between luminaire devices.

Figure 23:
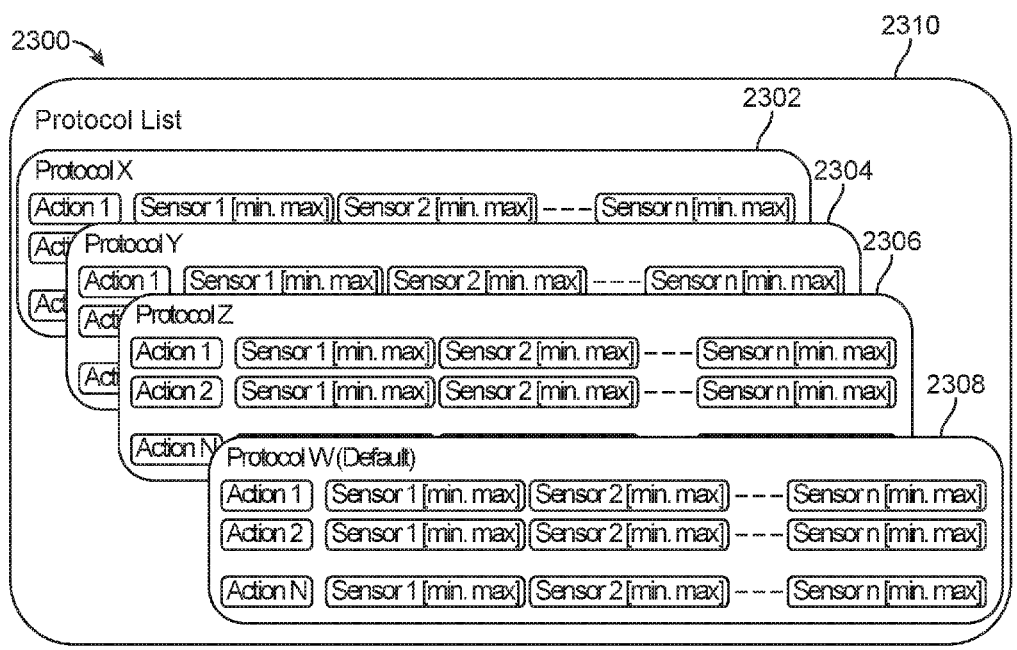
FIG. 23 is a diagram illustrating a list of protocols and their related actions and expected value range for sensor measurements of a system, according to an embodiment.

FIG. 23 illustrates an embodiment 2300 of a protocol list data structure 2310 for the gateway 102. The data structure 2310 may be designed such that it is easy to traverse the protocol options and pick the correct protocol during the discovery process. The protocol list includes N protocols, were N can be any number. In an embodiment, each protocol (X 2302, Y 2304, Z 2306 . . . W 2308) contains directives to the gateway 102 to setup the specific protocol interface (e.g., power level, specific line connections, and other required information as dictated by the protocol standard interface). Further, each protocol may contain a set of directives/actions numbered 1-N. The discovery process may use these directives to take actions like sending a message or changing the voltage level over the dimming control lines. According to an aspect, each action in the list is associated with a list of sensor measurement ranges, one per sensor and per power meter. These measurement ranges may be compared with actual readings as part of the dimming protocol discovery process. In an embodiment, at least one of the protocols, without limitation, can be marked as a default protocol W 2308. According to an aspect, this is the protocol to which the gateway 102 will default into when no other protocol is discovered.

Figure 24:
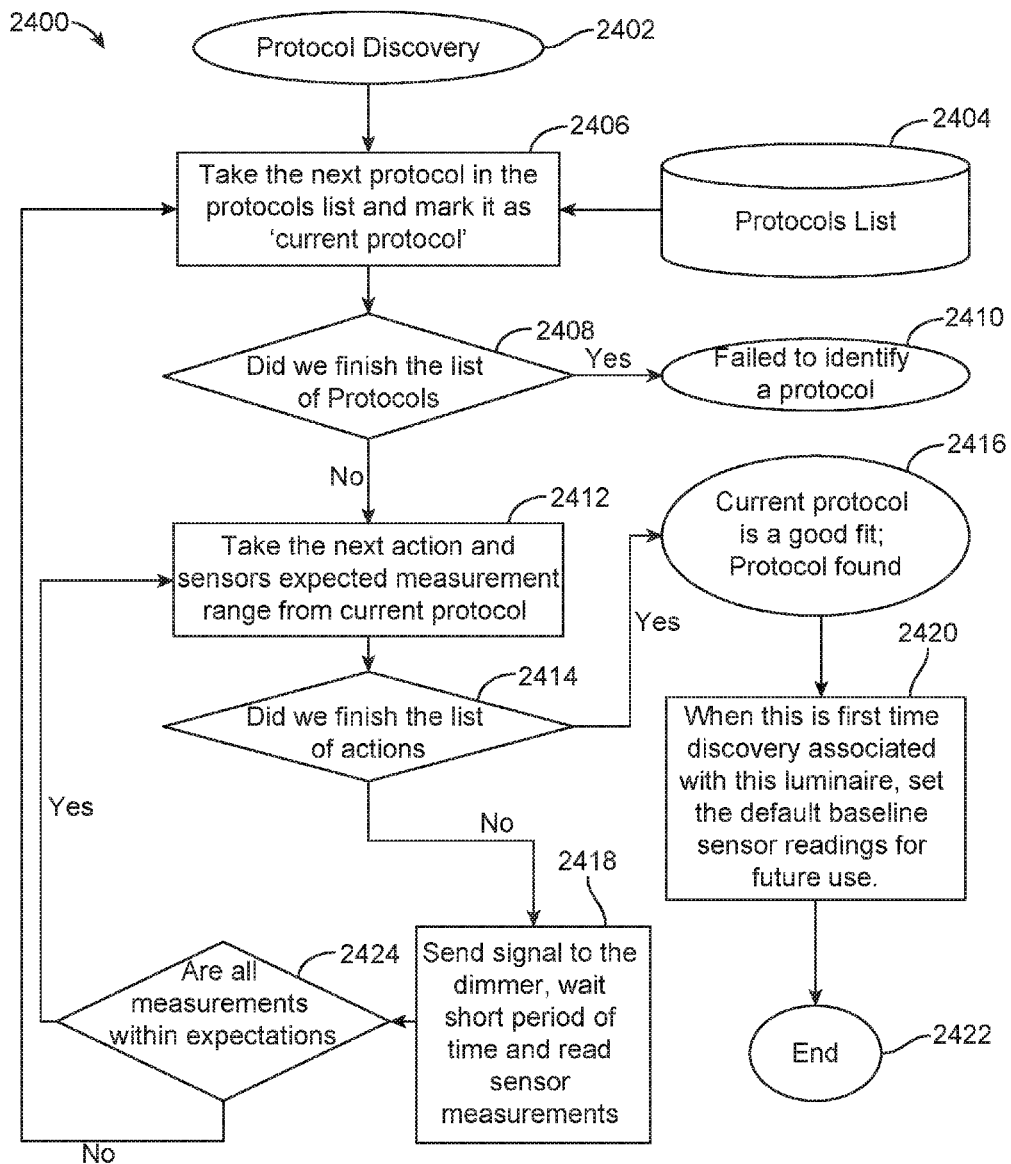
FIG. 24 is a flow chart illustrating a protocol discovery process of a system including a discovery algorithm, according to an embodiment.

FIG. 24 illustrates an embodiment 2400 of the protocol discovery process 2402. According to an aspect, at step 2404, the protocol is determined from a list of protocols, as seen, for instance, in FIG. 23. At step 2406, the process may include retrieving/taking/assuming a protocol from the list of protocols, and mark it as the "current protocol". The current protocol may include a dimming control protocol. At step 2408, the system may check if the entire list of protocols is finished. If the list is completed 'Yes', then the next step of operation goes to step 2410, which may indicate that there has been a failure to identify a protocol. In an embodiment, when a current protocol that has passed all of the verifications correctly is found, proper identification of the protocol and/or the identification process will be successfully achieved. If the list is not finished, 'No', then the next step of operation may go to step 2412. According to an aspect, at step 2412, the system activates the next action inside the protocol, and takes measurements via the sensors, based on a previously identified range. In other words, at step 2412, the system expects the measurements to be in specific ranges using the current protocol. In an embodiment, the method further includes receiving at least one real time sensing measurement from at least one sensor subsystem. The gateway 102 may utilize the at least one real time sensing measurement to correlate between the at least one dimming control protocol and between the plurality of luminaires. The sensor subsystem may be configured substantially as described hereinabove and illustrated in FIG. 3, and may include at least one of a color sensor and an environment sensor. Each of the sensor subsystem and the power meter may be physically connected to the at least one gateway 102, and the real time sensing measurement may be received by the at least one gateway 102 via at least one sensor interface. According to an aspect, the gateway 102 may be connected to the at least one power meter via a Universal Asynchronous Receiver/Transmitter interface. According to an aspect, the gateway 102 may also be connected to at least one network gateway 104 in a backhaul interface 118 via at least one of a LAN, a WLAN, a WAN, and a Mesh BLE radio network. In an embodiment, at least one network gateway 104 is connected to at least one cloud server 106 via the WAN.

At step 2414, the system may check whether the entire list of actions has been finished/completed. If the actions are finished, 'Yes', then the next step of operation is step 2416, which may include determining that the current protocol is a good choice/fit for the system, and the protocol may be finalized. According to an aspect, at step 2420, after the protocol is found, the system saves the default baseline sensor readings for future use. In an embodiment, at step 2422 the process ends. According to an aspect, if the actions are not finished in step 2414, 'No', then the next step of operation may be step 2418 where the system sends signals to the dimmer, waits a short period of time and reads sensor measurements.

In an embodiment, step 2424 may follow step 2418. According to an aspect, at step 2424, the measurement, such as, for example, the real time sensing measurement, is taken to see if they are within expectations. If 'Yes', measurement is within expectations then the system moves back to step 2412 to select the next action in the protocol verification process. If 'No', such as, for instance, measurement is outside the normal range, the system may move back to step 2406, where it will pick a new protocol to check. The steps in the process may include the following: The protocol list at step 2406 includes a pointer to the 'next protocol' and marks it as current protocol at step 2404 in use with this device. If no protocol is the 'next protocol', the pointer may be pointing to an empty protocol indicating that the beginning of the list is next. The algorithm's first step is to advance the last protocol pointer to the next protocol in the list. If there are no protocols, e.g., after advancing through the end with an empty protocol, then there are no more protocols to check and the algorithm chooses the default protocol in the list, or simply exits with failure. In case the protocols list is not exhausted, there is a valid 'current protocol' to verify. The gateway sets up the dimming control lines to match the requirements of the 'current protocol'.

For every action in the 'current protocol', the gateway may take this action, wait a given amount of time associated with this action within the 'current protocol' action record information, and then reads current sensor measurements. If any of the measurements are outside the correlated range indicated by the sensor records list associated with this 'current protocol' and action, the gateway may move to the next protocol and start from the beginning to verify this new protocol. In cases where the sensor measurements meet the expected measurements indicated in the sensors list data range, the gateway may proceed to the next action in the list of 'current protocol'. In cases when there are no more actions to measure within the 'current protocol', the gateway may choose this 'current protocol' as the correct protocol for this device.

Protocol discovery can happen for multiple reasons. For example, when protocol discovery is initiated due to change in luminaire or when a new luminaire is being connected, the discovery protocol may add a step in which the base sensor parameters are updated to reflect the characteristics of the new luminaire. According to an aspect, this action helps set expected values and tune dimming parameters to sensor readings, such that appropriate correlation can be achieved. The gateway may keep historical correlated values for its sensor to enable correlation that is time dependent. For example, LED-based luminaire lumen values and the sensor readings may be impacted by the lumen state of the LED, and the lumen state and readings of the LED may deteriorate over time. According to an aspect, retaining/keeping historical or accumulated information may allow the gateway system to identify change in readings over time and to adjust the dimming directives to reflect the requested dimming level correctly. According to an aspect, the at least one gateway may distinguish between a digital protocol and at least one analog protocol. In an embodiment, the digital protocol includes one of DALI and DMX, and the analog protocol includes one of 0V-10V and 1V-10V.

The components of the system illustrated are not limited to the specific embodiments described herein, but rather, features illustrated or described as part of one embodiment can be used on or in conjunction with other embodiments to yield yet a further embodiment. It is intended that the system include such modifications and variations. Further, steps described in the method may be utilized independently and separately from other steps described herein.

The devices, systems, and methods have been described above, with reference to specific embodiments. Various changes may be made and equivalents may be substituted for elements thereof without departing from the scope of the disclosure. In addition, many modifications may be made to adapt a particular situation or material to the teachings found herein without departing from the essential scope thereof.

The disclosure, in various embodiments, configurations and aspects, includes components, methods, processes, systems and/or apparatuses as depicted and described herein, including various embodiments, sub-combinations, and subsets thereof. The various disclosed embodiments, configurations, and aspects include providing devices, systems, and processes in the absence of items not depicted and/or described herein or in various embodiments, configurations, or aspects hereof, including in the absence of such known items.

The foregoing discussion of the exemplary embodiments has been presented for purposes of illustration and description. The foregoing is not intended to limit the scope of the disclosure to the form or forms recited herein. In the foregoing Detailed Description for example, various features of the exemplary embodiments are grouped together in one or more embodiments, configurations, or aspects for the purpose of streamlining the disclosure. The features of the embodiments, configurations, or aspects of the exemplary embodiments may be combined in alternate embodiments, configurations, or aspects other than those discussed above. This method of disclosure is not to be interpreted as reflecting an intention that the exemplary embodiments require more features than may be recited in each claim. Thus, the following claims are hereby incorporated into this Detailed Description, with each claim standing on its own as a separate illustrative embodiment.

Moreover, the description of the exemplary embodiments has included descriptions of one or more embodiments, configurations, or aspects, and certain variations and modifications, other variations, combinations, and modifications that are within the scope of the disclosure including alternate, interchangeable and/or equivalent structures, functions, ranges or steps to those claimed, whether or not such alternate, interchangeable and/or equivalent structures, functions, ranges or steps are disclosed herein.

In this specification and the claims that follow, reference will be made to a number of terms that have the following meanings. The singular forms "a," "an" and "the" include plural referents unless the context clearly dictates otherwise. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. Variations in such ranges are possible consistent with this disclosure, including the claims, which does not limit potential variations to disclosed ranges.

Advances in science and technology may make equivalents and substitutions possible that are not now contemplated by reason of the imprecision of language; these variations should be covered by the appended claims. This written description uses examples to disclose the method, machine and computer-readable medium. Other examples consistent with this disclosure may exist and are encompassed by the disclosure.

What is claimed is:

1. A system for automatic luminaire location identification and group assignment, comprising:
   a gateway configured to control a dimming level of a first luminaire to change an illumination of the luminaire;

a first sensor subsystem configured to measure a direction and a change in the illumination received by the sensor subsystem; and, a server in data communication with the gateway, wherein the gateway is configured to dim the first luminaire and then gradually reduce the dimming level of the first luminaire, the first sensor subsystem is configured to continuously measure the direction and change in illumination received by the sensor subsystem as the dimming level of the first luminaire is reduced and transmit data regarding the direction and change in illumination to the server, and the server is configured to determine a location of the first luminaire relative to the first sensor subsystem based at least in part on the data regarding the direction and change in illumination.

2. The system of claim 1, further comprising a second sensor subsystem, wherein the second sensor subsystem includes a color sensor configured to face the first luminaire directly and the first sensor subsystem includes an environment sensor configured to face away or in a downward direction from a second luminaire associated with the first sensor subsystem.

3. The system of claim 2, wherein the environment sensor includes a low-resolution imaging sensor and is configured to measure the direction and change in illumination received by the first sensor subsystem according to a reverse Lucas-Kanade method.

4. The system of claim 3, wherein the color sensor is configured to measure at least a color intensity of the first luminaire.

5. The system of claim 4, wherein the color sensor is a Red Green Blue (RGB) sensor.

6. The system of claim 4, wherein the server is further configured to determine a location of the first luminaire relative to the first sensor subsystem based at least in part on the color intensity of the first luminaire.

7. The system of claim 6, wherein the server is further configured to assign the first luminaire to a neighborhood group of luminaires based at least in part on the location of the first luminaire relative to the first sensor subsystem and second luminaire or additional luminaires associated with the first sensor subsystem.

8. The system of claim 1, wherein the server is further configured to compare the relative location of the first luminaire to actual luminaire locations on a floor plan and assign the first luminaire to an actual location based at least in part on the comparison.

9. A method for automatic luminaire location identification and group assignment, comprising:

dimming a first luminaire via a gateway configured to control a dimming level of the first luminaire to change an illumination of the first luminaire;

gradually reducing the dimming level of the first luminaire via the gateway;

continuously measuring with a first sensor subsystem a direction and a change in illumination received by the first sensor subsystem as the dimming level of the first luminaire is reduced;

transmitting data regarding the direction and change in illumination from the first sensor subsystem to a server; and, calculating with the server a location of the first luminaire relative to the first sensor subsystem based at least in part on the data regarding the direction and change in illumination.

10. The method of claim 9, further comprising continuously measuring with a color sensor of a second sensor subsystem at least a color intensity of the first luminaire, wherein the color sensor is configured to face the first luminaire directly.

11. The method of claim 10, wherein the color sensor is a Red Green Blue (RGB) sensor.

12. The method of claim 10, wherein calculating a location of the first luminaire is based at least in part on the color intensity of the first luminaire.

13. The method of claim 12, further comprising assigning the first luminaire to a neighborhood group of luminaires based at least in part on the location of the first luminaire relative to the first sensor subsystem and one or more luminaires associated with the first sensor subsystem.

14. The method of claim 13, further comprising comparing the relative location of the first luminaire to actual luminaire locations on a floor plan and assigning the first luminaire to an actual location based at least in part on the comparison.

15. The method of claim 9, wherein the first sensor subsystem includes an environment sensor configured to measure the direction and change in illumination received by the first sensor subsystem.

16. The method of claim 15, wherein the environment sensor includes at least one low-resolution imaging sensor and measures the direction and change in illumination according to a reverse Lucas-Kanade method.

17. A system for automatic luminaire location identification and group assignment, comprising:

one or more gateways each configured to control a dimming level of at least one luminaire to change an illumination of each luminaire;

at least one sensor subsystem configured to continuously measure a direction and a change in illumination received by the at least one sensor subsystem; and, at least one server in data communication with each gateway, wherein each gateway is configured to dim each associated luminaire and then gradually reduce the dimming level of each luminaire one at a time, each sensor subsystem is configured to continuously measure the direction and change in illumination received by the sensor subsystem as the dimming level of each luminaire is reduced and transmit data regarding the direction and change in illumination to the server, and the server is configured to determine a location of each luminaire relative to each sensor subsystem and other luminaires associated with each sensor subsystem, and generate a virtual map of luminaire locations, based at least in part on the data regarding the direction and change in illumination received by each sensor subsystem.

18. The system of claim 17, wherein each sensor subsystem includes at least one low-resolution image sensor configured to detect the direction and change in illumination received by the sensor subsystem based on a reverse Lucas-Kanade method.

19. The system of claim 18, wherein each sensor subsystem includes at least one color sensor configured to directly face a luminaire associated with the sensor subsystem and continuously measure at least a color intensity of the associated luminaire.

20. The system of claim 19, wherein the server is configured to determine the location of each luminaire relative to each sensor subsystem and other luminaires based at least in part on the color intensity of each luminaire.

* * * * *